United States Patent
Terauchi et al.

(10) Patent No.: US 6,921,576 B2
(45) Date of Patent: Jul. 26, 2005

(54) ACTIVE ENERGY RAY-CURABLE ANTISTATIC COATING COMPOSITION

(75) Inventors: Makoto Terauchi, Mie (JP); Noritaka Hosokawa, Mie (JP); Kazuhide Hayama, Mie (JP)

(73) Assignee: Mitsubishi Chemical Corporation, Tokyo (JP)

(*) Notice: Subject to any disclaimer, the term of this patent is extended or adjusted under 35 U.S.C. 154(b) by 233 days.

(21) Appl. No.: 10/266,735

(22) Filed: Oct. 9, 2002

(65) Prior Publication Data

US 2003/0129421 A1 Jul. 10, 2003

(30) Foreign Application Priority Data

| Oct. 9, 2001 | (JP) | ................................ 2001-311303 |
| Oct. 23, 2001 | (JP) | ................................ 2001-324704 |
| Feb. 27, 2002 | (JP) | ................................ 2002-050831 |

(51) Int. Cl.$^7$ ................................ B32B 5/16
(52) U.S. Cl. ............... 428/404; 428/403; 428/405; 428/407; 428/447; 106/287.11; 106/287.13; 106/287.14; 106/287.19; 106/287.23; 522/71; 522/148; 523/209; 523/212; 523/216
(58) Field of Search ................ 523/209, 212, 523/216; 522/71, 148; 106/287.11, 287.13, 287.14, 287.19, 287.23; 428/403, 404, 405, 407, 447

(56) References Cited

U.S. PATENT DOCUMENTS

| 4,546,072 A | * | 10/1985 | Matrick | .................... 430/449 |
| 5,378,735 A | | 1/1995 | Hosokawa et al. | |
| 5,409,965 A | | 4/1995 | Hosokawa et al. | |
| 5,565,501 A | | 10/1996 | Hosokawa et al. | |
| 5,683,501 A | * | 11/1997 | Tomihisa et al. | ........... 106/491 |
| 6,017,974 A | | 1/2000 | Hosokawa et al. | |

FOREIGN PATENT DOCUMENTS

| JP | 05-179160 | * | 7/1993 |
| WO | WO 84/00375 | | 2/1984 |

OTHER PUBLICATIONS

Machine Translation, JP 05–179160, Jul. 20, 1993, Fukushima et al.*
Patent Abstracts of Japan, JP 11139996, May 25, 1999.
Patent Abstracts of Japan, JP 2002–194084 A, Jul. 10, 2002.
Derwent Publications, AN 1997–062010, XP–002268002, JP 08–311366, Nov. 26, 1996.

* cited by examiner

Primary Examiner—Randy Gulakowski
Assistant Examiner—Christopher Keehan
(74) Attorney, Agent, or Firm—Oblon, Spivak, McClelland, Maier & Neustadt, P.C.

(57) ABSTRACT

An active energy ray-curable antistatic coating composition contains (A) inorganic oxide fine particles having a side chain having a molecular weight of at least 300 and having a functional group and (B) an antistatic agent containing at least a quaternary ammonium salt group-containing polymer, a quaternary ammonium salt group-containing silane coupling agent and/or a hydrolysis condensate of the silane coupling agent, and optionally contains (C) a polyfunctional (meth)acrylate having at least 3 (meth)acryloyl groups in a molecule.

47 Claims, No Drawings

ACTIVE ENERGY RAY-CURABLE ANTISTATIC COATING COMPOSITION

BACKGROUND OF THE INVENTION

1. Field of the Invention

The present invention relates to an active energy ray-curable coating composition for forming a film having excellent hardness, abrasion resistance, transparency and antistatic properties by irradiating with active energy rays.

2. Discussion of the Background

Plastic products such as polycarbonate, polymethylmethacrylate, polyethylene terephthalate, polybutylene terephthalate, styrene type resins including acrylonitrile.butadiene.styrene (ABS) resin, methylmethacrylate.styrene (MS) resin and acrylonitrile.styrene (AS) resin, vinyl chloride type resins and cellulose acetate including triacetyl cellulose, and their resin substrates, are excellent in their lightness, easy processability, impact resistance and the like, and are accordingly applicable to various uses including containers, instrument panels, wrapping materials, various housing materials, optical disk substrates, plastic lens, liquid crystal displays, plasma displays and other display substrates.

However, these plastic products have poor surface hardness and are easily damaged. Transparent resins such as polycarbonate and polyethylene terephthalate have defects of losing inherent satisfactory transparency or external appearance, and they are hardly usable in such a field as to require an abrasion resistance.

Therefore, an active energy ray-curable hard coating material (covering material) imparting a satisfactory abrasion resistance to the surfaces of these plastic products is demanded. However, cured layers of commercially available active energy ray-curable hard coating materials have a high surface resistivity and have a large defect of generating static electricity. The generation of static electricity accelerates attachment of dust and dirt, and loses beautiful appearance or transparency of a product.

In order to solve these problems, a method for coating an active energy ray-curable coating material or a method for coating an antifouling coating material, which provides film imparting abrasion resistance and antistatic properties to the surface of a plastic product, have been variously studied. In addition, it has been considered to provide a plastic product having an abrasion-resistant antistatic layer on the surface of a plastic product and having a transparent film having an adhesive layer attached to the back side.

However, these methods have been still unsatisfactory in abrasion resistance.

Accordingly, various active energy ray-curable coating agents providing more satisfactory hardness and abrasion resistance than conventional methods have been recently proposed. For example, JP-A-11-309814 discloses coating at least two layers of coating agents, in which an inorganic film-formable coating agent such as polysilazane is used as the outermost layer, thereby greatly improving abrasion resistance. However, there are problems that it is difficult to make a thick film with the inorganic coating agent and that productivity becomes poor because of coating at least two layers.

On the other hand, by coating at least two layers of coating agents having different elasticities, it has been tried to improve hardness and abrasion resistance. For example, JP-A-2000-52472 discloses providing a second layer of a coating agent having an elasticity higher than an elasticity of a coating agent of a first layer to obtain a coating film having a high hardness. On the other hand, JP-A-2000-214791 discloses providing a second layer of a coating agent having an elasticity lower than an elasticity of a coating agent of a first layer to obtain a coating film having a high hardness. In these manners, an apparent hardness seems to be produced by absorbing an impact and avoiding a concentration of stress, but when a total thickness of a coating film exceeds 10 microns, at least two layers are coated, thus raising a problem such as a poor productivity.

Also, JP-A-2000-219845 discloses coating a methacrylic polymer as a first layer and then laminating a cured coating layer comprising a colloidal silica and an organosiloxane resin of a hydrolysis condensate of a specific silicate as a second layer, thereby producing a coating film having a total thickness of at most 10 microns and having an excellent abrasion resistance, but a problem of a poor productivity is still caused since at least two layers are coated.

Further, JP-A-2000-15734 discloses to improve hardness by using a coating agent having a low elasticity component such as a urethane acrylate oligomer blended with a polyfunctional acrylate and then imparting antistatic properties by providing a multi-layer coating of an electroconductive layer such as an ITO (indium.tin composite oxide) layer and an inorganic layer such as an $SiO_2$ layer. However, when such an antistatic layer is provided, a multi-layer coating must be provided, thus raising a productivity problem.

On the other hand, various coating agents for achieving excellent hardness and abrasion resistance even by monolayer coating have been studied. Accordingly, a composition comprising colloidal silica and polyfunctional acrylates, a hydrolysate.condensate composition comprising colloidal silica and a specific silicate, a curable resin composition comprising these materials and a polyfunctional acrylate, an epoxy resin, a phenoxy resin or the like, and a composition comprising these materials and an acrylic resin polymer have been heretofore widely studied as an organic.inorganic composite coating agent, but all of these compositions have provided problems such as not achieving satisfactory hardness and abrasion resistance, poor stability of a coating solution, and poor environmental durabilities (moisture resistance, heat resistance or the like) of a cured film.

As compared with these prior arts, an active energy ray-curable coating agent comprising a compound obtained by reacting a polyfunctional acrylate with a colloidal silica as a base as disclosed in JP-A-5-287215 and JP-A-9-100111 provides more satisfactory hardness and abrasion resistance even by monolayer coating as compared with a conventional organic inorganic composite coating agent, but antistatic properties are still low and dusts or soils are easily attached.

As a coating agent for providing antistatic properties, JP-A-10-279833 and JP-A-2000-80169 disclose a technique of blending an organic cationic material such as a quaternary ammonium salt structure, and JP-A-2000-95970 discloses a technique of blending an anionic material such as an organic sulfonate. In addition, a composite of an inorganic ion-conductive material and a nonionic material such as a polyalkylene glycol, a technique of using a silicate, a technique of dispersing an inorganic electroconductive filler, a technique of blending an organic π electron conjugate polymer and the like have been studied.

However, in these inventions, hardness and abrasion resistance are not satisfactory. In systems containing colloidal silica effective for realizing a high hardness, some techniques have been proposed to realize hardness and antistatic properties, but all of them include a technique of adding an electroconductive filler (such as metal fine particles or electroconductive composite oxides) as an antistatic property-imparting component, and there are many restrictions to applicable uses because of problems of coloring and hardly making a thick film.

On the other hand, by combining an organic cationic material and a colloidal silica, it is possible to make a thick film, but due to an ionic interaction between anions on the surface of the colloidal silica and the organic cationic material, a dispersion state becomes easily unstable, and it has been difficult to achieve homogeneous blending. As a method for improving this problem, it has been proposed to combine an organoalkoxysilane and a polyfunctional acrylate as described in JP-A-5-179160 and JP-A-5-179161, and it has been disclosed that it is possible to homogeneously mix colloidal silica and an antistatic property-imparting agent such as an organic cationic material. The cured material derived therefrom is excellent in hardness and antistatic properties. However, its surface resistivity is on the order of $10^{10}$ ($\Omega$) and antistatic properties are still unsatisfactory, and abrasion resistance is also still unsatisfactory. Particularly, with regard to an organic cationic material having a high performance of realizing antistatic properties in the order of $10^8$ to $10^9$ ($\Omega$) presently demanded in many uses, it has been difficult to homogeneously mix and it has been quite difficult to freely blend.

On the other hand, it is relatively easy to homogeneously mix a colloidal silica with other antistatic agents (such as an organic anionic material, an organic nonionic antistatic agent or a silicate), but a compatibility with an organic high hardness-imparting component such as a polyfunctional acrylate is poor and a transparency is lost (organic anionic material), and an antistatic property level achieved is unsatisfactorily on the order of $10^{10}$ to $10^{12}$ ($\Omega$) (an organic nonionic antistatic agent or a silicate) and they are not satisfactory for practical use. The present inventors heretofore proposed an improved method of introducing an organic anionic group into a polyfunctional acrylate itself in the former case (for example, as described in JP-A-7-41695) to improve transparency, but its performances were still unsatisfactory in view of presently required levels of hardness and antistatic properties. Also, the present inventors proposed to improve performances by combining a silicate and a polyfunctional acrylate having a carboxyl group in the latter case (for example, as described in JP-A-8-325474), but its performances were still unsatisfactory in view of presently required levels of hardness and antistatic properties.

SUMMARY OF THE INVENTION

A problem to be solved in the present invention is to obtain a coating agent realizing excellent hardness and antistatic properties in a relatively thin film monolayer as compared with conventional compositions. Accordingly, an object of the present invention is to obtain an active energy ray-curable coating composition capable of forming a film cured by irradiation with active energy rays, which has excellent hardness, abrasion resistance, transparency and antistatic properties.

The present inventors have discovered that by surface-treating inorganic oxide (colloid-like) fine particles such as a colloidal silica with a specific silane coupling agent having a molecular weight of at least 300 and having a polymerizable unsaturated group, or with a silane coupling agent having at least a specific molecular weight and having a specific polar group or a branched bulky structure group having a polar group but not having a radical polymerizable functional group, or by using organic-inorganic composite particles obtained by bonding a polymer having a (meth) acryloyl group with inorganic oxide fine particles (typically silica sol) by way of an oxysilylalkylene sulfide bond, it is possible to homogeneously mix the inorganic oxide fine particles with an organic cationic antistatic material having a high performance (such as a polymer type antistatic agent having a quaternary ammonium salt group structure or a silane coupling agent type antistatic agent containing a quaternary ammonium salt group structure) which otherwise could not be homogeneously mixed. In this manner, a high antistatic property on the order of $10^8$ to $10^9$ ($\Omega$) could be achieved while maintaining excellent abrasion resistance and tensile hardness. Also, by introducing an active energy ray-curable group or by introducing a slip property-imparting group such as a polysiloxane, abrasion resistance and pencil hardness could be improved, and by combining with other antistatic property-imparting agent, antistatic properties could be improved, and by combining with a polyfunctional active energy ray-curable compound, abrasion resistance and pencil hardness could be improved even by irradiating with active energy rays such as a relatively low energy ultraviolet light, and excellent hardness and abrasion resistance could be obtained by a monolayer of a relatively thin film, and by using organic-inorganic composite particles obtained by bonding a polymer having a (meth) acryloyl group with inorganic oxide fine particles (typically silica sol) by way of an oxysilylalkylene sulfide bond, an excellent film-formability could be obtained. Thus, in this manner, the present invention could be accomplished.

An active energy ray-curable coating composition of the present invention is a composition containing particles obtained by bonding inorganic oxide fine particles with an organic compound (silane coupling agent) having a polymerizable unsaturated group and further a group such as a (thio)urethane group or a thioether group, a polymer having a quaternary ammonium salt group structure in a molecule or a silane coupling agent having a quaternary ammonium salt group structure in a molecule or its derivative, and a polyfunctional (meth)acrylate compound, as the main components, and by coating this composition directly or by way of other layer on a resin substrate and irradiating with active energy rays such as electron rays or ultraviolet rays. The coating composition can provide a coated product having excellent flaw resistance, hardness and antistatic properties of high level without losing transparency.

Also, an active energy ray-curable antistatic coating composition of the present invention is a composition containing particles obtained by bonding inorganic oxide fine particles with an organic compound having a polar group and/or a polar bulky structure group and further a group such as a (thio)urethane group or a thioether group but not having a radical polymerizable functional group, a polymer having a quaternary ammonium salt group structure in a molecule or a silane coupling agent having a quaternary ammonium salt group structure in a molecule or its derivative, and a polyfunctional (meth)acrylate compound, as the main components, and by coating this composition directly or by way of other layer on a resin substrate and then irradiating with active energy rays such as electron rays or ultraviolet rays. The coating composition can provide a coated product having excellent flaw resistance, hardness and antistatic properties of satisfactory level without losing transparency.

Also, an active energy ray-curable antistatic coating composition of the present invention is a composition comprising organic-inorganic composite particles obtained by bonding a polymer having a (meth)acryloyl group with inorganic oxide fine particles (typically silica sol) by way of an oxysilylalkylene sulfide bond, a polymer having a quaternary ammonium salt group structure in a molecule or a silane coupling agent having a quaternary ammonium salt group structure in a molecule or its derivative, and a polyfunctional (meth)acrylate compound, as the main components, and this composition is coated on a resin substrate directly or by way of other layer to form a film having an excellent film-formability. Further, by irradiating with active energy rays such as electron rays or ultraviolet rays, a coated product having excellent flaw resistance, hardness and antistatic properties of satisfactory level can be obtained without losing transparency.

DESCRIPTION OF THE PREFERRED EMBODIMENTS

Hereinafter, the present invention is further described in more details.

(A) Inorganic Oxide Fine Particles Having a Side Chain Having a Molecular Weight of at Least 300 and Having a Functional Group (A-1) Inorganic Oxide Fine Particles Examples of inorganic oxides include oxides of silicon, aluminum, zirconium, titanium, zinc, lead, germanium, indium, tin, antimony and cerium or their composite oxides, and preferable oxides include silicon oxide (silica), aluminum oxide (alumina), silicon-aluminum composite oxide, zirconium oxide (zirconia), titanium oxide (titania), zinc oxide, tin oxide, antimony-doped tin oxide, indium-tin composite oxide (ITO) and cerium oxide, but are not be limited thereto. Silica is particularly preferable as a main component.

Examples of shapes of inorganic oxide fine particles include sphere-like, hollow, porous, bar-like, fibrous, plate-like or amorphous shapes, and among them, a sphere-like shape is preferable. A primary particle size of a metal oxide is preferably from 1 to 100 nm. If the primary particle size is less than 1 nm, an effect of improving flaw resistance or hardness becomes low, and if the primary particle size is at least 100 nm, the particles tend to unpreferably cause secondary agglomeration and transparency tends to be lost.

The primary particle size of an inorganic oxide can be measured by BET method, dynamic light scattering method, centrifugal settling method, laser scattering method or the like. With regard to a sphere-like sol, it is usual to measure by BET method.

The inorganic oxide fine particles may be a powder in dry state or a solution or dispersion in water or an organic solvent. It is preferable to use a sol dissolved or dispersed in an organic solvent for realizing an excellent transparency. Typically, it is most preferable to use an organosilica sol dissolved or dispersed in an organic solvent having a hydroxyl group (hereinafter optionally referred to as "OH group") or a polar solvent having a ketone group as a main component. Typical examples of a commercially available product include IPA-ST (organosilica sol dispersed in IPA, manufactured by Nissan Chemical Industries, Ltd.), MEK-ST (organosilica sol dispersed in MEK, manufactured by Nissan Chemical Industries, Ltd.), and MIBK-ST (organosilica sol dispersed in MIBK, manufactured by Nissan Chemical Industries, Ltd.). Also, it is possible to use a sol of these materials having a solvent substituted with other organic solvent having an OH group (for example, organosilica sol dispersed in PGM).

(A-2) The side chain is a chemical group attached to the inorganic fine particles. Silane coupling agent having a molecular weight of at least 300 and having a radical polymerizable functional group or a silane coupling agent having a molecular weight of at least 300 and having a polar functional group or a bulky structure polar group. Molecular weight for the side chain is the sum of the atomic weights of all the atoms of the side chain.

Examples of silane coupling agents used for treating inorganic oxide fine particles (A-1) include silane coupling agents having a molecular weight of at least 300 and having a radical polymerizable functional group or silane coupling agents having a molecular weight of at least 300 and having a polar functional group or a bulky structure polar group.

One of compounds (A-2) is a silane coupling agent having a molecular weight of at least 300 and having a radical polymerizable functional group. A kind of a polymerizable unsaturated group is not specially limited, but a group curable by active energy rays is particularly preferable, examples of which include an acryloyl group ($CH_2$=CH—CO—), a methacryloyl group, an acrylamide group ($CH_2$=CH—CO—NH—), and a methacrylamide group. Its position is not specially limited, but it is preferable that it is present at the terminal of a molecule. Also, its number is not specially limited, but it is preferable to contain from 1 to 5 polymerizable unsaturated groups in one molecule.

Also, another one of compounds (A-2) is a silane coupling agent having a highly polar functional group or a silane coupling agent having a bulky structure polar functional group. Kinds of the highly polar functional group or the bulky functional group are not specially limited, but preferable examples include a polyalkylene oxide group, a carboxylic acid (ester) group, a polycarboxylic acid (ester) group and the like, and it is preferably a structure having a nonionic or acidic polar group but not containing a radical polymerizable functional group (such as an acryloyl group or a methacryloyl group).

On the other hand, when used alone a silane coupling agent having a polar group such as a quaternary ammonium salt group or having a non-polar group such as a long chain alkyl group or a polyalicyclic structure can easily cause agglomeration with an inorganic oxide. This is not preferable since a protective colloid effect becomes poor or agglomeration is accelerated.

The position of a polar group is not specially limited, but it is preferable that it is present at the terminal of a molecule. Also, its number is not specially limited, but it is preferable to contain from 1 to 5 functional groups in one molecule. Also, when a molecular weight is small, a protective colloidal effect is not sufficiently achieved, and therefore the molecular weight should be preferably at least 300.

Also, this compound is preferably an organic compound having a functional group expressed by the following formula (1),

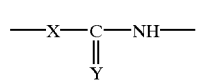

(1)

wherein X and Y are respectively independently any of an oxygen atom, a sulfur atom and an imino group.

The group expressed by the formula (1) provides an appropriate cohesive force by hydrogen bonding among molecules to achieve an effect of imparting mechanical strength, adhesion to a substrate, heat resistance or the like, and also works as a spacer between a silica surface and a radical polymerizable functional group or a specific polar functional group to suppress an excessive cohesion. Examples of these groups include functional groups expressed by the following formulae (2).

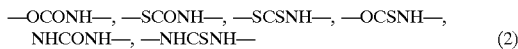 (2)

Among these groups, —OCONH— and —SCONH— are particularly preferable in view of thermostability and ease of synthesis.

Also, this compound may be an organic compound having a thioether group. The thioether group also works as a spacer between a silica surface and a radical polymerizable functional group or a specific polar functional group, and is considered to have an effect of suppressing an excessive cohesion.

As a functional group of a silane coupling agent capable of bonding with an inorganic oxide, an alkoxysilyl group capable of forming a silanol group is particularly preferable. Examples of the alkoxysilyl group include a monoalkoxysilyl group, a dialkoxysilyl group and a trialkoxysilyl group, and among them, a trialkoxysilyl group of a lower alcohol such as a trimethoxysilyl group or a triethoxysilyl group is particularly preferable in view of reactivity. The position of these groups in a molecule is preferably at another terminal of a molecule on the opposite side of a polymerizable unsaturated group. Also, the number of these groups is preferably from 1 to 3, more preferably 1 in one molecule.

A silanol group or a silanol group-forming unit bonds with the inorganic oxide fine particles by a condensation reaction or a condensation reaction caused after hydrolysis.

Preferable examples of these compounds (A-2) are illustrated below:

① a compound obtained by bonding an OH group-containing (meth)acrylate compound and/or (meth)acrylamide compound with an isocyanate group (hereinafter optionally referred to as "NCO group")-containing trialkoxysilane by way of a —OCONH— bond, ② a compound obtained by bonding a highly polar group-containing compound having an OH group with a trialkoxysilane having an isocyanate group (hereinafter optionally referred to as "NCO group") by way of a —OCONH— bond, and a compound obtained by bonding a bulky group-containing compound having an OH group with a trialkoxysilane having an NCO group by way of a —OCONH— bond, ③ a compound obtained by bonding a trialkoxysilane having a mercapto group (hereinafter optionally referred to as "SH group") with a (meth)acrylate compound having one NCO group of diisocyanate bonded to a —SCONH— bond and having an OH group on other NCO group and/or a (meth)acrylamide compound, by way of a —OCONH— bond, ④ a compound obtained by bonding a trialkoxysilane having a mercapto group (hereinafter optionally referred to as "SH group") with a highly polar group-containing compound having one NCO group of diisocyanate bonded to a —SCONH— bond and having an OH group on other NCO group or a bulky group-containing compound having an OH group, by way of a —OCONH— bond, ⑤ a compound obtained by bonding an NCO group-containing (meth)acrylate compound and/or (meth)acrylamide compound with an SH group-containing trialkoxysilane by way of a —SCONH— bond, ⑥ a compound obtained by bonding a compound having a (meth)acryloyl group and a highly polar group or a bulky substituent in a molecule with an SH group-containing trialkoxysilane by way of a thioether bond formed by Michael-addition reaction of the SH group to the (meth)acryloyl group, ⑦ a compound obtained by bonding a compound having at least 2 (meth)acryloyl groups and/or (meth)acrylamide groups in a molecule with a trialkoxysilane having an SH group by way of a thioether bond formed by Michael-addition reaction of the SH group to the unsaturated group ((meth)acryloyl group and/or (meth)acrylamide group), and ⑧ a compound obtained by reacting a mono(meth) acrylic acid ester of α,ω-hydroxy-terminated polyalkylene glycol with a silane coupling agent having an NCO group. However, the compound (A-2) is not limited to the above illustrated examples.

Examples of an OH group-containing (meth)acrylate and (meth)acrylamide compound include a mono(meth)acrylate (such as hydroxyethyl acrylate, hydroxyethyl methacrylate, hydroxypropyl acrylate or hydroxypropyl methacrylate), a mono(meth)acrylamide (such as hydroxyethyl acrylamide, hydroxyethyl methacrylamide, hydroxypropyl acrylamide or hydroxypropyl methacrylamide), a di(meth)acrylate (such as glycerin di(meth)acrylate or trimethylolpropane di(meth)acrylate), a di(meth)acrylamide, a tri- to poly(meth)acrylate (such as pentaerythritol triacrylate, dipentaerythritol tri- to pentaacrylate or ditrimethylolpropane triacrylate), and the like.

Examples of an OH group-containing polyalkylene glycol include an ether type polyalkylene glycol such as a monoalkyl ether of polyethylene glycol (e.g. polyethylene glycol monomethyl ether or polyethylene glycol mono lauryl ether) and a monoalkyl phenyl ether of polyethylene glycol (e.g. polyethylene glycol nonyl phenyl ether or polyethylene glycol octyl phenyl ether), a polyethylene glycol monocarboxylic acid ester (e.g. polyethylene glycol monolaurate or polyethylene glycol monooleate), a monoalkyl ether of polyalkylene glycol block copolymer, a monoalkyl ether of polyalkylene glycol random copolymer, and the like.

Examples of an NCO group-containing trialkoxysilane compound include compounds obtained by bonding triethoxysilylpropylisocyanate (e.g. KBE9007 manufactured by Shin-Etsu Chemical Co., Ltd.), trimethoxysilylpropylisocyanate or a trialkoxysilylalkylmercaptan such as trimethoxysilylpropylmercaptan (e.g. KBM803 manufactured by Shin-Etsu Chemical Co., Ltd. and SH6062 manufactured by Toray Dow Corning Silicone Co., Ltd.) with one NCO group of a diisocyanate (e.g. isophorone diisocyanate, hexamethylene diisocyanate, MDI or TDI) by way of a thiourethane bond.

Examples of an OH group-containing carboxylic acid (ester) include α-hydroxycarboxylic acid (methyl ester), β-hydroxycarboxylic acid (methyl ester) or the like, for example, lactic acid or methyl lactate, β-hydroxybutyric acid, methyl, β-hydroxybutyrate, γ-hydroxycarboxylic acid (methyl ester) or the like, for example, γ-hydroxybutyric acid, methyl γ-hydroxybutyrate, and the like, but are not limited thereto.

Examples of an OH group-containing polycarboxylic acid ester include a poly(di- to penta-)carboxylic acid ester having a branched structure such as glycerin diacetic acid ester, trimethylol propane diacetic acid ester, pentaerythritol triacetic acid ester, dipentaerythritol pentaacetic acid ester, dimethyl tartrate or the like, but are not limited thereto.

An —OCONH— bond obtained by reaction of an OH group and an NCO group is obtained by blending respective compounds in a ratio of NCO group/OH group $\leq 1$ and stirring the mixture at 60 to 100° C. for 1 to 20 hours. In order to prevent polymerization by an acryloyl group during the reaction, it is preferable to use a polymerization inhibitor such as hydroquinone, hydroquinone monomethyl ether, catechol, p-t-butylcatechol or phenothiazine in an amount of 0.01 to 1 wt %, preferably from 0.05 to 0.5 wt %, to the reaction mixture. Also, in order to accelerate the reaction, a well known reaction catalyst such as di-n-butyl tin dilaurate or DABCO (1,4-diazabicyclo[2.2.2]octane) may be employed. Further, the reaction may be carried out in a solvent containing no group reactive with an isocyanate group, such as a ketone type solvent including methyl ethyl ketone or methyl isobutyl ketone, an ether type solvent including ethylene glycol diethyl ether or diethylene glycol dimethyl ether, a carboxylic acid ester type solvent including ethyl acetate or butyl acetate, an aromatic hydrocarbon solvent including xylene or toluene, and the like, and/or in the presence of a polyfunctional acrylate having at least 3 (meth)acryloyl groups in a molecule.

Examples of a (meth)acrylate compound having an NCO group include compounds obtained by bonding β-isocyanate ethyl acrylate, β-isocyanate ethyl methacrylate (e.g. Karenz MOI manufactured by SHOWA DENKO K.K.), or OH group-containing (meth)acrylate or (meth)acrylamides (previously described), with one NCO group of diisocyanate (e.g. isophorone diisocyanate, hexamethylene diisocyanate, MDI or TDI), by way of a urethane bond.

Examples of a trialkoxysilane compound having an SH group include trimethoxysilylpropylmercaptan (e.g. KBM 803 manufactured by Shin-Etsu Chemical Co., Ltd., SH6062 manufactured by Toray Dow Corning Silicone Co., Ltd.), and the like.

The formation of the —SCONH— bond by reaction of an NCO group and an SH group is carried out in the same manner as in the formation of the —OCONH— bond by reaction of an NCO group and an OH group.

Examples of a polyfunctional acrylate compound are not specially limited, provided that it is a compound having at least 3 acryloyl groups in one molecule, but typical examples include pentaerythritol triacrylate, pentaerythritol tetraacrylate, dipentaerythritol pentaacrylate, dipentaerythritol hexaacrylate, ditrimethylolpropane tetraacrylate, polyester acrylates, polyfunctional urethane acrylates, and the like.

Examples of a polyalkylene glycol having a (meth) acryloyl group include polyethylene glycol mono(meth) acrylate, poly(ethylene/propylene)glycol mono(meth) acrylate, poly(ethylene/tetramethylene)glycol mono(meth) acrylate, or their monoalkyl ether or monoalkyl phenyl ether.

Examples of a (poly)carboxylic acid ester containing a (meth)acryloyl group include a (meth)acrylic acid lower alkyl ester such as methyl (meth)acrylate or butyl (meth) acrylate, a compound having one carboxylic acid ester group per one molecule in addition to a (meth)acrylic acid ester group such as methyl α-acryloyl oxypropionate, and a compound having at least 2 carboxylic acid ester groups per one molecule in addition to a (meth)acrylic acid ester group such as a mono(meth)acrylate of trimethylolpropane diacetic acid ester.

The reaction of a trialkoxysilyl compound having an SH group and a polyfunctional acrylate or a mono(meth)acrylate is carried out under such conditions as generally known as Michael addition reaction. This reaction proceeds at room temperature in the absence of a catalyst, but it is practically preferable to accelerate the reaction by employing a catalyst. Examples of the catalyst employed in the reaction include a metal alkoxide, a cyclic amine, a quaternary ammonium salt or tertiary phosphines. Among them, tertiary phosphines are preferable in view of its catalytic activity and handling properties, and triphenylphosphine is particularly preferable.

Examples of a mono(meth)acrylic acid ester compound of α,ω-hydroxy-terminated polyalkylene glycol include polyethylene glycol mono(meth)acrylate, polypropylene glycol mono(meth)acrylate, polytetramethylene glycol mono (meth)acrylate, poly(ethylene/propylene)glycol mono (meth)acrylate, and poly(ethylene/tetramethylene)glycol mono(meth)acrylate.

The reaction of a mono(meth)acrylic acid ester compound of α,ω-hydroxy-terminated polyalkylene glycol and a trialkoxysilyl compound having an NCO group can be carried out in the same manner as in the formation of the —OCONH— bond by reaction of an NCO group and an OH group.

Reaction of (A-1) and (A-2)

This bonding reaction can be carried out by various methods generally used in the synthesis of this type of compound. Basically, it is general to carry out a method comprising hydrolyzing an alkoxysilyl group to form a silanol group and then subjecting to the silanol group to condensation reaction with an alkoxy group and/or a hydroxy group on the surface of an inorganic oxide.

Water used is selected in such a range as not to deteriorate performances of a coating film and stability of a coating agent. The water amount is from 1 to 400 mol %, preferably from 30 to 200 mol %, to an alkoxysilyl group. If the water amount is less than 1 mol %, hydrolysis and condensation reaction are hardly carried out, and on the other hand, if the water amount exceeds 400 mol %, gelling is easily caused, such being unpreferable. Also, examples of water used include distilled water, ion exchanged water, industrial water, and soft water.

Also, in order to accelerate the hydrolysis and condensation reaction, an acid or an alkali, or other appropriate compounds may be used as a catalyst. They can be used without being specially limited as long as they do not deteriorate performances of a coating film and performances of a coating agent. Examples of an acid catalyst include an inorganic acid such as hydrochloric acid, phosphoric acid or boric acid, an organic acid such as citric acid, maleic acid, acetic acid or para-toluene-sulfonic acid, and examples of an alkali catalyst include alcoholic potassium hydroxide, ammonia, trialkylamines, and heterocyclic ring-containing amines such as dimethylaminopyridine. Other effective examples include a metal acetylacetone complex such as aluminum triacetylacetonate.

In addition, there is a method of introducing a polymerizable unsaturated group or a specific polar functional group and a bonding group of the formula (1) or the formula (2), which comprises previously reacting an alkoxysilyl compound having a functional group capable of forming a bonding group of the formula (1) or the formula (2) among components capable of synthesizing a compound (A-2), with a compound (A-1), and then reacting with other compound. A trialkoxysilane compound having an SH group as a compound having an alkoxysilyl group in the formula (1) can be previously reacted with a compound (A-1).

For example, a compound having the same structure as the above compound ③ or ④ can be obtained by a method which comprises reacting a trialkoxysilane having an SH group with an inorganic oxide, and then reacting the SH group with a diisocyanate compound to bond with one NCO group by way of a —SCONH— bond and to bond an OH group-containing (meth)acrylate and/or (meth)acrylamide compound or a highly polar group-containing compound or a compound having an OH group and a bulky substituent with the remaining NCO group by way of a —OCONH— bond.

Also, a compound having the same structure as the above compound ⑤ or ⑥ can be obtained by reacting a trialkoxysilane having an SH group with an inorganic oxide and then reacting with a (meth)acrylate compound and/or a (meth)acrylamide compound, which have an NCO group or a highly polar group or a bulky functional group.

The reaction ratio of (A-1)/(A-2) is from 90/10 to 5/95, preferably from 80/20 to 10/90, in a weight ratio. If the reaction ratio is (A-1)/(A-2)>90/10, the surface treatment of an inorganic oxide is unsatisfactory, and on the other hand, if the reaction ratio is (A-1)/(A-2)<5/95, a dispersion state becomes unstable or a viscosity is remarkably raised because an alkoxysilane itself is condensed, polymerized or crosslinked. Also, it is necessary that the molecular weight of (A-2) is at least 300. If the molecular weight is less than 300, an effect of forming a protective colloid is small or a silane coupling agent itself is condensed and tends to cause agglomeration by cross-linking or gelling.

The reaction is generally carried out at a temperature of from room temperature to 100° C. for from 1 hour to 100 hours. Preferably, their reaction is carried out at room temperature for at least 4 hours and then further carried out by heating at a temperature of from room temperature to 70° C. for from 1 to 10 hours. In order to prevent a side reaction, the reaction system may be diluted with a solvent. The solvent used preferably has a compatibility with a silane alkoxide as a hydrolysate, water and a catalyst, examples of which include alcohols such as methanol, ethanol, isopropanol or isobutanol, ketones such as acetone, methyl ethyl ketone or methyl isobutyl ketone, ethers such as tetrahydrofuran or dioxane, OH group-containing ethers such as propylene glycol monomethyl ether, and the like.

Also, a part (less than 50 wt %) of (A-2) may be substituted with other silane coupling agent. Examples of the other silane coupling agent include well known various commercially available silane coupling agents, and a silane coupling agent having no radical polymerizable functional group but having a polyalkylene glycol structure, a silane coupling agent having a carboxyl group or an ester group, a silane coupling agent having an alicyclic structure, a silane coupling agent obtained by reaction of a bulky alcohol having a branched structure and an alkoxysilyl group having an NCO group, and the like.

Further, in addition to this material, inorganic oxide fine particles having a side chain (side chain of (A)) having a molecular weight of at least 300 and having a functional group such as a silyl ether group of the following structural formula may be used.

—O—Si—R—S—P

In the above formula, R is a $C_{2-10}$ alkylene group which may be branched and P is a polymer unit having at least one (meth)acryloyl group.

A method for preparing the above inorganic oxide fine particles is not specially limited, but it is preferable to prepare them by the following method.

At first, a silica sol having a mercapto group is prepared by hydrolysis-condensation of a mercapto group-containing silane coupling agent and a silica sol (first step).

The structure of the above mercapto group-containing silane coupling agent is not specially limited so long as it contains a mercapto group and an alkoxy group in one molecule. Its examples include trimethoxysilylpropylmercaptan (e.g. trade name "KBM803" available from Shin-Etsu Silicone K.K. and trade name "SH6062" available from Toray Dow Corning Silicone Co., Ltd.), triethoxysilylpropylmercaptan, and the like.

The above silica sol is preferably a silica sol containing from 10 to 40% of silica having a particle size of from 5 to 30 nm as a solid content dispersed in a dispersing medium such as water, methanol, isopropanol, n-butanol, isobutanol, ethylene glycol, ethyl cellosolve, propylene glycol monomethyl ether, propylene glycol monomethyl ether acetate, methyl ethyl ketone, methyl isobutyl ketone, dimethylacetamide, xylene or their mixture solvent. Particularly, it is preferable to employ a silica sol dispersed in an organic solvent since it provides a high transparency when it is coated. Typically, it is preferable to employ an organo silica sol dispersed in a solvent having a hydroxyl group or a polar solvent having a ketone group. Their examples include "IPA-ST" (organo silica sol dispersed in IPA by Nissan Chemical Industries, Ltd.), "MEK-ST" (organo silica sol dispersed in MEK by Nissan Chemical Industries, Ltd.), "MIBK-ST" (organo silica sol dispersed in MIBK by Nissan Chemical Industries, Ltd.), or a solvent-substituted sol of these starting materials, the solvent of which is substituted with other organic solvent having a hydroxyl group (e.g. organo silica sol dispersed in PGM).

Hydrolysis-condensation reaction of a mercapto group-containing silane coupling agent and a silica sol is carried out by adding water to this mixture. An alkoxy silyl group of the mercapto group-containing silane coupling agent is hydrolyzed with water to form a silanol group, and condensation reaction is carried out between the silanol group thus formed and a silanol group on the surface of the silica sol to obtain a silica sol having a mercapto group on the surface.

The amount of water added is an amount corresponding to such a theoretical amount as to hydrolyze 100% of an alkoxy silyl group of the mercapto group-containing silane coupling agent, e.g. from 100 to 300% of the corresponding theoretical amount, preferably from 100 to 200% of the corresponding amount.

In order to accelerate this hydrolysis reaction, it is possible to add a hydrolysis catalyst to the reaction system. Examples of the hydrolysis catalyst include acetyl acetone aluminum, butoxide borate, acetic acid, hydrochloric acid, maleic acid, oxalic acid, fumaric acid, dibutyl tin dilaurate, dibutyl tin dioctate, p-toluene sulfonic acid and their mixtures. An amount of the hydrolysis catalyst used is from 0.1 to 5 parts by weight, preferably from 0.5 to 5 parts by weight, to 100 parts by weight of the mercapto group-containing silane coupling agent.

The reaction is carried out at a temperature of from room temperature to 100° C. for 1 to 100 hours, preferably at room temperature for at least 4 hours and then by heating at 40 to 70° C. for 1 to 10 hours. Also, in order to prevent a side reaction, the reaction system may be diluted with a solvent. Examples of the solvent used include a solvent compatible with water and a catalyst, such as alcohols including methanol, ethanol, isopropanol and isobutanol; ketones including acetone, methyl ethyl ketone and methyl isobutyl ketone; ethers including tetrahydrofuran and dioxane; hydroxyl group-containing ethers including propylene glycol monomethyl ether; and the like.

A weight ratio of a mercapto group-containing silane coupling agent and a silica sol (solid content) in the reaction system is preferably from 0.1/99.9 to 10/90, more preferably from 1/99 to 5/95. If the weight ratio of the mercapto group-containing silane coupling agent is less than 0.1, an amount of a mercapto group to be bonded with the silica sol is small and an amount of a part to be bonded with a polymer containing an epoxy group becomes small, and therefore it becomes hard to stably produce inorganic oxide fine particles of the polymer and the silica sol. On the other hand, if the weight ratio of the mercapto group-containing silane coupling agent exceeds 10, an amount of the part to be bonded with the polymer having an epoxy group is already sufficient, and it is not practical to use the mercapto group-containing silane coupling agent in an amount of exceeding the weight ratio of 10.

Thereafter, at least one kind of monomer having an epoxy group and one radical polymerizable group is radical-polymerized in the presence of a silica sol having a mercapto group prepared in the above first step (second step).

By carrying out radical-polymerization of a monomer in the presence of a silica sol having a mercapto group, chain transfer reaction is carried out between the mercapto group bonded to the silica sol and the radical of the monomer under growing reaction in the process of polymerization, and a polymer is bonded with the silica sol by way of a sulfide bond. An epoxy group in the monomer is maintained in the polymer as it is.

Examples of the monomer having an epoxy group and one radical polymerizable group (hereinafter, it may be referred to as "epoxy group-containing monomer") used in the above second step include glycidyl (meth)acrylate ("(meth)acryl" means both of "methacryl" and "acryl"), 3,4-epoxycyclohexylmethyl (meth)acrylate, and the like. If necessary, the monomer having an epoxy group may be radical-copolymerized with other monomers. Examples of other monomers copolymerizable with the monomer having an epoxy group include a monomer having one radical-polymerizable group. Particular examples include (meth)acrylic acid, methyl (meth)acrylate, ethyl (meth)acrylate, n-butyl (meth)acrylate, isobutyl (meth)acrylate, 2-ethylhexyl (meth)acrylate, isodecyl (meth)acrylate, lauryl (meth)acrylate, tridecyl (meth)acrylate, stearyl (meth)acrylate, benzyl (meth)acrylate, cyclohexyl (meth)acrylate, isobornyl (meth)acrylate, tetrahydrofurfuryl (meth)acrylate, dicyclopentenyl (meth)acrylate, dicyclopentenyloxyethyl (meth)acrylate, ethoxyethyl (meth)acrylate, ethyl-carbitol (meth)acrylate, butoxyethyl (meth)acrylate, 2-hydroxyethyl (meth)acrylate, 2-hydroxypropyl (meth)acrylate, 2-hydroxybutyl (meth)acrylate, 2-hydroxy-3-phenoxypropyl (meth)acrylate, dimethylaminoethyl (meth)acrylate, diethylaminoethyl (meth)acrylate, cyanoethyl (meth)acrylate, styrene, and the like.

When other monomers are employed, together with the epoxy group-containing monomer, a weight ratio of the epoxy group-containing monomer/other monomer is preferably from 100/0 to 10/90, more preferably from 100/0 to 30/70. If the weight ratio of the epoxy group-containing monomer is less than 10 wt %, an amount of a (meth)acryloyl group to be introduced in the following third step becomes small, and a satisfactory abrasion resistance sometimes cannot be obtained.

Polymerization reaction of a monomer (an epoxy group-containing monomer and other monomer optionally used) and an inorganic component (solid component of silica sol) is carried out preferably in a weight ratio of from 30/70 to 95/5, more preferably from 50/50 to 90/10. If the weight ratio of a silica sol as an inorganic component exceeds 70, stable inorganic oxide fine particles cannot be obtained. On the other hand, if the weight ratio of the silica sol is less than 5, abrasion resistance tends to become unsatisfactory.

This radical polymerization reaction is carried out in a solvent in the presence of a general radical polymerization initiator.

Examples of the solvent include alcohols such as methanol, ethanol, n-propanol, isopropanol or n-butanol; ketones such as acetone, methyl ethyl ketone, methyl isobutyl ketone or cyclohexanone; ethers such as 2-methoxy ethanol, 2-ethoxy ethanol, 2-butoxy ethanol, 1-methoxy-2-propanol, 1-ethoxy-2-propanol, ethylene glycol dimethyl ether, ethylene glycol diethyl ether or diethylene glycol dimethyl ether; ether esters such as 2-methoxyethyl acetate, 2-ethoxyethyl acetate or 2-butoxyethyl acetate; aromatic hydrocarbons such as toluene or xylene; esters such as ethyl acetate, propyl acetate or butyl acetate; and the like, and they may be used in a mixture.

Examples of the radical polymerization initiator used in polymerization reaction include peroxides such as benzoyl peroxide, di-t-butyl peroxide or cumene hydroperoxide; azo compounds such as 2,2'-azobisisobutyronitrile, 2,2'-azobis-(2,4-dimethylvaleronitrile) or 2,2'-azobis (4-methoxy-2,4-dimethylvaleronitrile); and the like.

A concentration of a monomer in the reaction system is generally from 10 to 60 wt %, and a concentration of a polymerization initiator is generally from 0.1 to 10 wt % to the total weight of the monomer.

Thereafter, a compound having a carboxyl group and a (meth)acryloyl group is added to a polymer prepared in the above second step (third step).

Examples of a compound having a carboxyl group and a (meth)acryloyl group (hereinafter referred to as "(meth)acryloyl group-introducing reagent") used in the third step include an acid anhydride adduct of (meth)acrylic acid, 2-(meth)acryloyloxyethylsuccinic acid, 2-(meth)acryloyloxyethylphthalic acid, 2-(meth)acryloyloxyethylhexahydrophthalic acid or pentaerythritol tri(meth)acrylate with succinic anhydride, phthalic anhydride or hexahydrophthalic anhydride; an acid anhydride adduct of dipentaerythritol penta(meth)acrylate with succinic anhydride, phthalic anhydride or hexahydrophthalic anhydride; and the like.

In the above third step, an epoxy group in a polymer is reacted with a carboxyl group in a (meth)acryloyl group-introducing reagent. It is preferable to mix the polymer and the (meth)acryloyl group-introducing reagent in such a ratio as to make an epoxy group/a carboxyl group at least 1, preferably from 1 to 10.

The reaction is carried out preferably at a temperature of from 50 to 110° C. for from 3 to 50 hours. In the reaction, a well-known catalyst may be used in order to accelerate the reaction, examples of which include triethyl amine, tributyl amine, triethylene diamine, N,N-dimethylbenzyl amine, benzyltrimethylammonium chloride, tetramethylammonium bromide or triphenyl phosphine. In an amount of the catalysts used is preferably from 0.01 to 2 wt %, more preferably from 0.05 to 1 wt %, to the reaction mixture.

Also, in order to prevent radical polymerization by a (meth)acryloyl group, it is preferable to employ a polymerization inhibitor in the reaction, examples of which include hydroquinone, hydroquinone monomethyl ether, catechol, p-t-butyl catechol or phenothiazine. An amount of the polymerization inhibitor used is preferably from 0.01 to 1 wt %, more preferably from 0.05 to 0.5 wt %, to the reaction mixture.

Also, when using these components as the component (A), it is sometimes preferable to further add a solvent in order to improve coatability.

Examples of the solvent used may be various reaction solvents used in the respective production steps of the inorganic oxide fine particles, and they may be a dispersion medium for a silica sol used in the first step or solvent used for the reaction in the second step. Also, they may be a solvent used for adjusting a solvent after producing the inorganic oxide fine particles.

Examples of the above solvent include alcohols such as methanol, ethanol, n-propanol, isopropanol or n-butanol; ketones such as acetone, methyl ethyl ketone, methyl isobutyl ketone or cyclohexanone; ethers such as 2-methoxy ethanol, 2-ethoxy ethanol, 2-butoxy ethanol, 1-methoxy-2-propanol, 1-ethoxy-2-propanol, ethylene glycol dimethyl ether, ethylene glycol diethyl ether or diethylene glycol dimethyl ether; ether esters such as 2-methoxyethyl acetate, 2-ethoxyethyl acetate or 2-butoxyethyl acetate; aromatic hydrocarbons such as toluene or xylene; esters such as ethyl acetate, propyl acetate or butyl acetate; and the like. Also, they may be used in a mixture.

(B) Antistatic Agent

An antistatic agent is required to contain at least one of a quaternary ammonium salt group-containing polymer, a quaternary ammonium salt group-containing silane coupling agent and its hydrolysis condensate.

The quaternary ammonium salt group-containing polymer may be a commercially available material used as a permanent antistatic agent, but is preferably a copolymer of a (meth)acrylic acid ester, a (meth)acrylic acid amide or a styrene type compound, which has a number average molecular weight of from 1,000 to 1,000,000 and has a quaternary ammonium salt group structure on a side chain, in view of antistatic performance, transparency, hardness and a balance with other performances, and a particularly preferable example should also have a (meth)acryloyl group on a side chain in view of an improved compatibility.

Further, a material having a polydimethylsiloxane structure on the main chain and/or a side chain is preferable since it can provide antistatic properties in a small amount, and a particularly preferable example is a copolymer containing α,ω-dimercaptopolydimethylsiloxane as a copolymerizable component and having a polydimethylsiloxane structure introduced into the main chain.

Examples of the quaternary ammonium salt group-containing polymer are illustrated below:

(a) a quaternary ammonium salt of a copolymer of N,N-dialkylaminoalkyl(meth)acrylic acid ester/other (meth)acrylic acid ester, (b) a quaternary ammonium salt of a copolymer of N,N-dialkylaminoalkyl(meth)acrylamide/other (meth)acrylic acid ester, (c) a quaternary ammonium salt of an adduct of a copolymer of N,N-dialkylaminoalkyl(meth)acrylic acid ester/other (meth)acrylic acid ester (styrenes)/hydroxyalkyl(meth)acrylic acid ester and a (meth)acryloyl group-containing isocyanate compound, (d) a quaternary ammonium salt of an adduct of a copolymer of N,N-dialkylaminoalkyl(meth)acrylic acid ester/other (meth)acrylic acid ester (styrenes)/hydroxyalkyl(meth)acrylic acid ester/(meth)acryloyl-terminated polydimethylsiloxane and a (meth)acryloyl group-containing isocyanate compound, (e) a polymer having an amino group-containing polydimethylsiloxane added to a quaternary ammonium salt of an adduct of a copolymer of N,N-dialkylaminoalkyl(meth)acrylic acid ester/other (meth)acrylic acid ester/(styrenes)/hydroxyalkyl(meth)acrylic acid ester/(meth)acryloyl-terminated polydimethylsiloxane and a (meth)acryloyl group-containing isocyanate compound, (f) a quaternary ammonium salt of an adduct of a copolymer of N,N-dialkylaminoalkyl(meth)acrylic acid ester/(meth)acrylic acid ester (styrenes)/hydroxyalkyl(meth)acrylic acid ester/mercapto-terminated polydimethylsiloxane and a (meth)acryloyl group-containing isocyanate compound, and (g) a quaternary ammonium salt of an adduct of a copolymer of N,N-dialkylaminoalkyl(meth)acrylamide/(meth)acrylic acid ester (styrenes)/hydroxyalkyl(meth)acrylic acid ester/mercapto-terminated polydimethylsiloxane and a (meth)acryloyl group-containing isocyanate compound.

Examples of a quaternary group-forming agent (quaternizing agent) for modifying an amino group into a quaternary ammonium salt include an alkyl halide (methyl chloride or the like), an alkenyl halide (allyl chloride or the like), an aralkyl halide (benzyl chloride or the like), alkyl sulfates such as dimethyl sulfate or diethyl sulfate, sulfonic acid esters such as methyl p-toluenesulfonate, α-haloaliphatic carboxylic acid derivatives such as methyl chloroacetate, α-haloketones such as chloroacetone, α-haloalkylnitrile such as chloroacetonitrile, and the like. Among them, in order to obtain an excellent antistatic property, it is preferable to employ an alkyl halide, an alkenyl halide or an α-haloaliphatic carboxylic acid derivative as a quaternizing agent, which has a carbon number of at most 4. A particularly preferable example is a quaternary ammonium salt group-containing polymer obtained by modifying an adduct of a (meth)acryloyl group-containing isocyanate compound and a copolymer of N,N-dialkylaminoalkyl(meth)acrylic acid ester/other (meth) acrylic acid ester and/or styrenes/hydroxyalkyl(meth)acrylic acid ester/mercapto-terminated polydimethylsiloxane as defined in the above paragraph (f), with a quaternizing agent such as methyl chloride, aryl chloride or methyl chloroacetate.

A quaternary ammonium salt group-containing silane coupling agent is partly commercially available, but its function as an antistatic agent is generally low. As illustrated below, preferable examples include a silane coupling agent having a molecular weight of at least 400 obtained by bonding an N,N-dialkylamino alcohol and a silane coupling agent having an NCO group with a urethane bond and quaternizing it with an appropriate quaternizing agent, and/or its hydrolysis condensate, or a silane coupling agent having a molecular weight of at least 400 obtained by quaternizing an adduct of an N,N-dialkylaminoalkyl(meth)acrylic acid ester and a silane coupling agent having an SH group bonded with a thioether bond, or a hydrolysis condensate of such a silane coupling agent alone, or a hydrolysis co-condensate with other silane coupling agent, and the like.

Examples of such a quaternary ammonium salt group-containing silane coupling agent include a quaternary ammonium salt of a reaction product of an N,N-dialkylaminoaliphatic alcohol (such as N,N-dimethylaminoethanol or N,N-dimethylaminopropanol) and a trialkoxysilane having an NCO group (such as γ-trimethoxysilylpropylisocyanate), a quaternary ammonium salt of a reaction product of an N,N-dialkylaminoalkyl (meth)acrylic acid ester (such as N,N-dimethylaminomethacrylate) and a trialkoxysilane having a mercapto group (such as γ-mercaptopropyltrimethoxysilane), a hydrolysis condensate of each of them alone, a co-hydrolysis condensate of each of them with other silane coupling agent (particularly preferable examples of which include the above-mentioned silane coupling agent having an alkylene oxide chain or a radical-polymerizable silane coupling agent), and the like.

It is particularly preferable to use the above-mentioned two types of antistatic agents as an antistatic agent to be used in the present invention, but a part (less than 50% of the total antistatic agents) may be substituted with other antistatic agents in view of improvement in performances, cost or moldability. Examples of such other antistatic agents include a quaternary phosphonium salt compound having an alkyl group, a polyhydric alcohol having an ethylene oxide chain or its derivative, a metal alkoxide, an acetyl acetone metal complex, a thiocyanic acid metal salt, a metal halide, metal fine particles, a carboxylic acid metal salt, a sulfonic acid metal salt, electroconductive semiconductor fine particles, an electroconductive polymer, a partly hydrolyzed condensate of silicate or its derivative, and the like.

Basically, all of quaternary ammonium salt group-containing compounds other than the above two types of quaternary ammonium salt group-containing compounds are usable, but among them, a quaternary ammonium salt group-containing compound having an alkyl group is preferable. Concrete examples are illustrated below, but should not be limited thereto. Examples include a tetraalkylammonium halide such as dodecyltrimethylammonium chloride, an aralkyl trialkylammonium halide such as benzyl trimethylammonium chloride, a quaternary ammonium salt having a radical-polymerizable functional group such as methacryloxyethyl trimethylammonium chloride, and the like.

As other antistatic agents, a quaternary phosphonium salt group-containing compound having an alkyl group is illustrated. Examples of such a compound include a tetraalkylphosphonium halide such as dodecyltrimethylphosphonium chloride, an aralkyl trialkylphosphonium halide such as benzyl trimethylphosphonium chloride, a quaternary ammonium salt having a radical-polymerizable functional group such as methacryloxyethyl trimethylphosphonium chloride, and the like.

As other antistatic agents, a polyhydric alcohol having an ethylene oxide chain or its derivatives is illustrated. Typical examples of such compounds include a polyalkylene glycol mono(meth)acrylate such as polyethylene glycol mono (meth)acrylate, an alkylene oxide adduct of a polyhydric alcohol (such as glycerin, trimethylolpropane, pentaerythritol or dipentaerythritol), and its (meth)acrylic acid ester.

As other antistatic agents, a metal alkoxide is illustrated. Typical examples of such a compound include tetraisopropoxytitanium, tetrabutoxytitanium, triethyloxyvanadium, tetrabutyloxyzirconium, or the like.

As other antistatic agents, an acetylacetone metal complex is illustrated. Typical examples of such a compound include acetylacetone indium, acetylacetone vanadium, acetylacetone aluminum, and the like.

As other antistatic agents, a thiocyanic acid metal salt is illustrated. Typical examples of such a compound include sodium thiocyanate, potassium thiocyanate, and the like.

As other antistatic agents, a halogen-containing metal salt is illustrated. Typical examples of such a compound include titanic chloride, indium chloride, lithium perchlorate and the like.

As other antistatic agents, metal fine particles are illustrated. Typical examples of this compound include fine particles of copper, iron, nickel or the like. Fine particles used have generally a diameter of at most 100 nm, preferably at most 50 nm.

As other antistatic agents, a carboxylic acid metal salt is illustrated. Typical examples of such a compound include zinc polyacrylate, sodium acrylate, a potassium salt of an adduct of pentaerythritol triacrylate to pyromellitic anhydride, and the like.

As other antistatic agents, a sulfonic acid metal salt is illustrated. Typical examples of such a compound include sodium styrene sulfonate, sodium dioctylsulfosuccinate, and the like.

As other antistatic agents, a phosphate is illustrated. Typical examples of such a compound include a tertiary amine salt of bis(β-methacryloxyethyl)phosphate, sodium polyphosphate, and the like.

As other antistatic agents, electroconductive semiconductor fine particles are illustrated. Typical examples of such materials include the above-mentioned indium tin composite oxide such as ITO, cadmium tin, antimony oxide-doped tin oxide, and the like.

As other antistatic agents, an electroconductive polymer is illustrated. Typical examples of such a material include polyaniline, polyacetylene, polypyrrole, polythiophen, polyvinyl carbazole, and the like.

As other antistatic agents, a partly hydrolyzed condensate of silicate or its derivative is illustrated. Typical examples of such a compound include a partly hydrolyzed material of tetramethoxysilane and its lower condensate, a co-condensate with tetraethoxysilane, tetrabutoxysilane or other silane, and its hydrolyzed condensate, and the like.

Hereinafter, a blend ratio of component (A) and component (B) is illustrated. A preferable blend ratio is (A)/(B)= 20/1 to 1/20 (weight ratio of solid contents of A and B), more preferably 10/1 to 1/10. If the blend ratio is (A)/(B)>20, an antistatic property becomes unsatisfactory, while if the blend ratio is (A)/(B)<1/20, hardness is remarkably lowered. Also, if components (A) and (B) are mixed after respectively dissolving in a common solvent, agglomeration is hardly caused, such being preferable. Examples of such a solvent include an alcohol type solvent, particular examples of which include isopropanol, isobutanol, propylene glycol monomethyl ether (hereinafter referred to as "PGM") or the like, and they are preferable solvents since they are less volatile and have an appropriate hydrophilic-hydrophobic balance. Also, the agglomeration can be effectively prevented by raising a concentration of a component (A) solution, adding a component (B) solution to the component (A) solution and then fully stirring the mixture for from 30 minutes to 20 hours. In this case, it is preferable that a solid content concentration of the component (A) is at least 40 wt % and a solid content concentration of the component (B) is at most 30 wt %.

(c) Compound Having at Least 3 Acryloyl or Methacryloyl Groups Curable by Active Energy Rays in a Molecule Examples of a compound (polyfunctional (meth)acrylate) having at least 3 acryloyl or methacryloyl groups in a molecule to be used as one component of the composition of the present invention include trimethylolpropane triacrylate, ethyleneoxide-modified trimethylolpropane triacrylate, propyleneoxide-modified trimethylolpropane triacrylate, tris (acryloxyethyl)isocyanurate, caprolactone-modified tris (acryloxyethyl)isocyanurate, pentaerythritol triacrylate, pentaerythritol tetraacrylate, ethylene oxide-modified pentaerythritol tetraacrylate, ditrimethylolpropane tetraacrylate, dipentaerythritol tetraacrylate, dipentaerythritol pentaacrylate, dipentaerythritol hexaacrylate, alkyl-modified dipentaerythritol tetraacrylate, alkyl-modified dipentaerythritol pentaacrylate, caprolactone-modified dipentaerythritol hexaacrylate, a urethane acrylate obtained by reacting a polyisocyanate with a hydroxyl group-containing polyfunctional acrylate having a hydroxyl group and at least 3 acryloyl groups in a molecule, a carboxyl group-containing polyfunctional acrylate obtained by reacting a tetracarboxylic acid dianhydride with a hydroxyl group-containing polyfunctional acrylate having a hydroxyl group and at least 3 acryloyl groups in a molecule, and a mixture of two or more these compounds.

An amount of the component (c) used is generally from 10/90 to 80/20, preferably from 20/80 to 70/30, as a solid content weight ratio expressed by {(A)+(B)}/(C). If this ratio is smaller than 10/90, an antistatic effect and hardness become poor, while if this ratio is larger than 80/20, an effect of the component (C) (to impart a high curability by active energy rays or to impart tenacity to a coated film) is not sufficiently provided.

(D) Photopolymerization Initiator

Examples of a photopolymerization initiator include benzoin methyl ether, benzoin ethyl ether, benzoin isopropyl ether, benzoin isobutyl ether, diethoxyacetophenone, benzyldimethylketal, 2-hydroxy-2-methylpropiophenone, 1-hydroxycyclohexylphenylketone, benzophenone, 2,4,6-trimethylbenzoindiphenylphosphine oxide, 2-methyl-[4-(methylthio)phenyl]-2-morpholino-1-propanone, 2-benzyl-2-dimethylamino-1-(4-morpholinophenyl)-butane-1-on, Michler's ketone, isoamyl N,N-dimethylaminobenzoate, 2-chlorothioxanthone, 2,4-diethylthioxanthone, or the like, and these photopolymerization initiators may be used optionally in a mixture of two or more.

The photopolymerization initiator (D) is used generally in an amount of at most 10 wt %, preferably from 1 to 5 wt %, to the total amount of polymerizable components (A), (B) and (C).

In order to improve coating film properties, the composition of the present invention may further contain various additives respectively in an amount of from 0.01 to 2 wt %, examples of which include an ultraviolet light absorber (such as a benzotriazole type, benzophenone type, salicylic acid type or cyanoacrylate type ultraviolet light absorber), an antioxidant (such as a hindered phenol type, sulfur type or phosphorus type antioxidant), a light stabilizer (such as a hindered amine type light stabilizer), an anti-blocking agent, a slip agent, a leveling agent, and the like.

Further, in order to adjust a viscosity of a coating composition, the same solvent as used in the production of a polymer may be used.

Still further, if necessary, other polymers, a radical-polymerizable monomer, an oligomer or the like may be added to the composition in such a range as not to deteriorate physical properties of an aimed coating film of the present invention.

The composition of the present invention is coated on the surface of a plastic substrate under such conditions as to provide a coating layer having a thickness of from 1 to 50 microns, preferably from 3 to 20 microns, by a process which comprises coating the composition on a plastic substrate such as a polyester including polyethylene terephthalate or polyethylene naphthalate, a polymethyl methacrylate (PMMA) or a MMA copolymer (e.g. MS resin), a polycarbonate, a polyacetyl cellulose, or an ABS resin, by a coating method such as a dip coating, flow coating, spin coating, spray coating, bar coating, gravure coating, roll coating, blade coating or air knife coating method, solvent-drying to form a coating film, and irradiating with active energy rays.

Examples of the active energy rays include ultraviolet rays generated by a xenon lamp, a low pressure mercury lamp, a high pressure mercury lamp, an ultra-high pressure mercury lamp, a metal halide lamp, a carbon arc lamp or a tungsten lamp, or electron rays, $\alpha$ rays, $\beta$ rays or $\gamma$ rays generated by a particle accelerator of 20 to 2,000 kV.

The coating film thus cured by these active energy rays is particularly preferable since it provides a good productivity and a good balance of physical properties.

Hereinafter, the present invention is further illustrated with reference to Examples, Comparative Examples and Reference Examples, but is not limited thereto. In the Examples, parts and % are respectively expressed by parts by weight and % by weight.

REFERENCE EXAMPLE 1

Preparation of a Silane Coupling Agent Having a Polyfunctional Acryloyl Group by Reaction of an OH Group-Containing Polyfunctional Acrylate and an NCO Group-Containing Silane Coupling Agent 1 kg of a mixture of dipentaerythritol pentacrylate and dipentaerythritol hexaacrylate (KAYARAD DPHA, hereinafter referred to as "DPHA", manufactured by Nippon Kayaku Co., Ltd.), 100 g of γ-triethoxysilylpropylisocyanate (KBE9007, manufactured by Shin-Etsu Chemical Co., Ltd.), 0.2 g of dibutyltin dilaurate and 0.5 g of hydroquinone monomethylether were mixed with stirring, and were heated to 90° C. in an air stream and were maintained at that temperature for 1 hour. After confirming complete disappearance of absorption corresponding to the NCO group in accordance with infrared absorption spectrum analysis (IR), the reaction mixture was cooled to room temperature to obtain a product (silane coupling agent 1).

REFERENCE EXAMPLE 2

Synthesis of a Polyalkylene Glycol Chain-Containing Silane Coupling Agent Having a Methacryloyl Group at the Terminal 1 kg of poly(ethylene/propylene)glycol having a methacryloyl group at the terminal (BLEMER 70PEP350B, manufactured by NOF CORPORATION), 435 g of γ-triethoxysilylpropylisocyanate (KBE9007, manufactured by Shin-Etsu Chemical Co., Ltd.), 0.4 g of dibutyltin dilaurate and 0.5 g of hydroquinone monomethylether were mixed with stirring, and were heated to 90° C. in an air stream and were maintained at that temperature for 1 hour. After confirming complete disappearance of absorption corresponding to the NCO group in accordance with IR, the reaction mixture was cooled to room temperature to obtain a product (silane coupling agent 2).

REFERENCE EXAMPLE 3

Preparation of an NCO Group-Containing Polyfunctional Acrylate by Reaction of a Polyfunctional Acrylate and a Difunctional Isocyanate 1 kg of a mixture of pentaerythritol triacrylate and tetraacrylate (VISCOAT 300, manufactured by OSAKA ORGANIC CHEMICAL INDUSTRY LTD.), 0.36 kg of isophorone diisocyanate, 1 g of dibutyltin dilaurate, 2 g of hydroquinone monomethylether and 1.4 kg of methyl ethyl ketone (hereinafter referred to as "MEK") were mixed with stirring, and were reacted at 20 to 80° C. for 9 hours under air atmosphere. After confirming that about ½ of NCO groups of isophorone diisocyanate remained, the reaction mixture was cooled to room temperature to obtain a product (isocyanate 1).

REFERENCE EXAMPLE 4

Preparation of a Silane Coupling Agent Having a Polyfunctional Acryloyl Group by Reaction of an NCO Group-Containing Polyfunctional Acrylate and an SH Group-Containing Silane Coupling Agent 1 kg of the above obtained isocyanate 1 (solid content concentration 49%), 0.058 kg of γ-trimethoxysilylpropylmercaptan (KBM803, manufactured by Shin-Etsu Chemical Co., Ltd.), 0.5 kg of MEK and 0.5 g of dibutyltin dilaurate were mixed with stirring, and were reacted at 20 to 80° C. for 6 hours under air atmosphere. After confirming complete disappearance of the NCO group in accordance with IR, the reaction mixture was cooled to room temperature to obtain a product (silane coupling agent 3).

REFERENCE EXAMPLE 5

Preparation of a Silane Coupling Agent Having a Polyfunctional Acryloyl Group by Reaction of a Polyfunctional Acrylate and an SH Group-Containing Silane Coupling Agent 0.213 kg of a mixture of pentaerythritol triacrylate and tetraacrylate (VISCOAT 300, manufactured by OSAKA ORGANIC CHEMICAL INDUSTRY LTD.), 0.043 kg of γ-trimethoxysilylpropylmercaptan (KBM 803, manufactured by Shin-Etsu Chemical Co., Ltd.), 150 g of MEK and 0.8 g of triphenylphosphine were cooled and maintained at 20° C., and were stirred for 2 hours, and the reaction was then continued at 20 to 30° C. for 48 hours. After confirming disappearance of the SH group in accordance with IR, a product was obtained (silane coupling agent 4).

REFERENCE EXAMPLE 6

Preparation of a Silane Coupling Agent Having a Polyethylene Oxide Group by Reaction of an OH Group-Containing Polyethylene Oxide and an NCO Group-Containing Silane Coupling Agent 450 g of polyethylene glycol monomethylether (Aldrich reagent, average molecular weight 450), 247 g of γ-triethoxysilylpropylisocyanate (KBE9007, manufactured by Shin-Etsu Chemical Co., Ltd.) and 1 g of dibutyltin dilaurate were mixed with stirring, and were heated to 80° C. in a nitrogen stream, and were maintained at that temperature for 4 hours. After confirming complete disappearance of absorption corresponding to the NCO group in accordance with infrared absorption spectrum analysis (IR), the reaction mixture was cooled to room temperature to obtain a product (silane coupling agent 5).

REFERENCE EXAMPLE 7

Preparation of a Silane Coupling Agent Having a Methyl Carboxylate Group (COOCH$_3$ Group)

104 g of DL-methyl lactate, 247 g of γ-triethoxysilylpropylisocyanate (KBE9007, manufactured by Shin-Etsu Chemical Co., Ltd.), 350 g of methyl ethyl ketone (hereinafter referred to as "MEK") and 0.5 g of dibutyltin dilaurate were mixed with stirring, and were heated to 80° C. in a nitrogen stream, and were maintained at that temperature for 4 hours. After confirming complete disappearance of absorption corresponding to the NCO group in accordance with IR, the reaction mixture was cooled to room temperature to obtain a product (silane coupling agent 6).

REFERENCE EXAMPLE 8

Preparation of a Silane Coupling Agent Having a Polycarboxylic Acid Ester Group 218 g of trimethylolpropane diacetate, 247 g of γ-triethoxysilylpropylisocyanate (KBE9007, manufactured by Shin-Etsu Chemical Co., Ltd.) and 0.5 g of dibutyltin dilaurate were mixed with stirring, and were heated to 80° C. in a nitrogen stream, and were maintained at that temperature for 4 hours. After confirming complete disappearance of absorption corresponding to the NCO group in accordance with IR, the reaction mixture was cooled to room temperature to obtain a product (silane coupling agent 7).

TABLE A

| Molecular weight of silane coupling agent 1 to 7(*) | |
|---|---|
| silane coupling agent 1 | 771 |
| silane coupling agent 2 | 597 |
| silane coupling agent 3 | 741 |
| silane coupling agent 4 | 494 |
| silane coupling agent 5 | 697 |
| silane coupling agent 6 | 351 |
| silane coupling agent 7 | 465 |

(*)Molecular weights are calculated based on atomic weights of the atoms comprising the silane coupling agent.

REFERENCE EXAMPLE 9

Preparation of a Quaternary Ammonium Salt Group Structure-Containing Polymer 70 g of dimethylaminoethyl methacrylate, 10 g of methyl methacrylate, 20 g of 2-ethylhexyl methacrylate and 300 g of isopropanol (hereinafter referred to as "IPA") were mixed with stirring, and 1 g of 2,2'-azobis(2,4-dimethylvaleronitrile) (hereinafter referred to as "V65") was added thereto as a polymerization catalyst, and the mixture was heated to 65° C. in a nitrogen stream and was maintained at that temperature for 5 hours (about 1 g of V65 was additionally added during the reaction). Thereafter, the inside temperature was raised to 75 to 80° C. and was maintained for 2 hours to completely decompose the remaining V65. The temperature was returned to room temperature, and 200 g of IPA was additionally added, and methyl monochloroacetate was added in an amount corresponding to 0.95 mol to 1 mol of the dimethylaminoethyl methacrylate, and the mixture was reacted at 50 to 60° C. for 8 hours to effect quaternization. Thus, a polymer having a solid content of 25% was obtained (antistatic polymer 1).

REFERENCE EXAMPLE 10

Preparation of a Quaternary Ammonium Salt Group Structure-Containing Polymer 70 g of dimethylaminoethyl methacrylate, 5 g of methyl methacrylate, 20 g of 2-ethylhexyl methacrylate, 5 g of hydroxyethyl methacrylate (hereinafter referred to as "HEMA") and 300 g of MEK were mixed with stirring, and 1 g of V65 was added thereto, and the mixture was heated to 65° C. in a nitrogen stream and was maintained at that temperature for 5 hours (about 1 g of V65 was additionally added during the reaction). Thereafter, the inside temperature was raised to 75 to 80° C. and was maintained for 2 hours to completely decompose the remaining V65. The temperature was returned to room temperature, and 100 g of the above obtained isocyanate 1 was added to the mixture and 0.1 g of dibutyltin dilaurate and 0.2 g of hydroquinone monomethylether were added thereto, and the mixture was heated to 75° C. under air atmosphere. After reacting the mixture at 75 to 80° C. for 4 hours, methyl monochloroacetate was added in an amount corresponding to 0.95 mol to 1 mol of the dimethylaminoethyl methacrylate, and the mixture was reacted at 50 to 60° C. for 8 hours to effect quaternization. Thus, a polymer having a solid content of 30% was obtained (antistatic polymer 2).

REFERENCE EXAMPLE 11

Preparation of a Quaternary Ammonium Salt Group Structure-Containing Polymer 80 g of dimethylaminoethyl methacrylate, 10 g of bis-mercaptopolydimethylsiloxane (X-22-167B, manufactured by Shin-Etsu Chemical Co., Ltd.), 5 g of 2-ethylhexyl methacrylate, 5 g of HEMA and 300 g of MEK were mixed with stirring, and 1 g of V65 was added thereto, and the mixture was heated to 65° C. in a nitrogen stream and was maintained at that temperature for 5 hours (about 1 g of V65 was additionally added during the reaction). Thereafter the inside temperature was raised to 75 to 80° C. and was maintained for 2 hours to completely decompose the remaining V65. The temperature was returned to room temperature, and 100 g of the above obtained isocyanate 1 was added to the mixture, and 0.1 g of dibutyltin dilaurate and 0.2 g of hydroquinone monomethylether were added thereto, and the mixture was heated to 75° C. under air atmosphere. After reacting the mixture at 75 to 80° C. for 4 hours, the solvent was substituted by IPA to adjust a solid content concentration to 20%. The reaction content was transferred to a 1 l autoclave, and the temperature was raised to 50° C., and methyl chloride was introduced so as to make a gage pressure of 1 to 1.6 kg, and the pressure was maintained to react the mixture for 6 hours to effect quaternization. After returning the temperature to room temperature, the pressure was returned to normal pressure and the temperature was raised to 70° C. under air atmosphere to remove an excess methyl chloride. Thereafter, the temperature was returned to room temperature and the reaction product was taken out. Thus, a polymer having a solid content of 25% was obtained (antistatic polymer 3).

REFERENCE EXAMPLE 12

Preparation of a Quaternary Ammonium Salt Base Structure-Containing Polymer 90 g of dimethylaminoethyl methacrylate, 5 g of 2-ethylhexyl methacrylate, 5 g of HEMA and 300 g of MEK were mixed with stirring, and 1 g of V65 was added thereto, and the mixture was heated to 65° C. in a nitrogen stream and was maintained at that temperature for 5 hours (about 1 g of V65 was additionally added during the reaction). Thereafter, the inside temperature was raised to 75 to 80° C. and was maintained for 2 hours to completely decompose the remaining V65. The temperature was returned to room temperature, and 100 g of the above obtained isocyanate 1 was added and 0.1 g of dibutyltin dilaurate and 0.2 g of hydroquinone monomethylether were added thereto, and the mixture was heated to 75° C. under air atmosphere. After reacting the mixture at 75 to 80° C. for 4 hours, methyl monochloroacetate was added in an amount equivalent to 0.95 mol to 1 mol of the dimethylaminoethyl methacrylate, and the mixture was reacted at 50 to 60° C. for 8 hours to effect quaternization. As this result, a polymer having a solid content of 30% was obtained (antistatic polymer 4).

REFERENCE EXAMPLE 13

Preparation of a Quaternary Ammonium Salt Group Structure-Containing Polymer 80 g of dimethylaminoethyl methacrylate, 5 g of 2-ethylhexyl methacrylate, 5 g of HEMA, 10 g of methacryl-terminated polydimethylsiloxane (FM0725, manufactured by Chisso Corporation) and 300 g of MEK were mixed with stirring, and 1 g of V65 was added, and the mixture was heated to 65° C. in a nitrogen stream and was maintained at that temperature for 5 hours (about 1 g of V65 was additionally added during the reaction). Thereafter, the inside temperature was raised to 75 to 80° C. and was maintained for 2 hours to completely decompose the remaining V65. The temperature was returned to room temperature, and 100 g of the above obtained isocyanate 1 was added to the mixture and 0.1 g of dibutyltin dilaurate and 0.2 g of hydroquinone monomethylether were added thereto, and the mixture was heated to 75° C. under air atmosphere. After reacting the mixture at 75 to 80° C. for 4 hours, methyl monochloroacetate was added in an amount corresponding to 0.95 mol to 1 mol of dimethylaminoethyl methacrylate, and the mixture was reacted at 50 to 60° C. for 8 hours to effect quaternization. As this result, a polymer having a solid content of 30% was obtained (antistatic polymer 5).

REFERENCE EXAMPLE 14

Preparation of a Quaternary Ammonium Salt Group Structure-Containing Polymer 80 g of dimethylaminoethyl methacrylate, 10 g of bis-mercaptopolydimethylsiloxane (X-22-167B, manufactured by Shin-Etsu Chemical Co., Ltd.), 5 g of 2-ethylhexyl methacrylate, 5 g of HEMA and 300 g of MEK were mixed with stirring, and 1 g of V65 was added thereto, and the mixture was heated to 65° C. in a nitrogen stream and was maintained at that temperature for 5 hours (about 1 g of V65 was added during the reaction). Thereafter, the inside temperature was raised to 75 to 80° C. and was maintained for 2 hours to completely decompose the remaining V65. After returning the temperature to room temperature, 100 g of the above obtained isocyanate 1 was added to the mixture, and 0.1 g of dibutyltin dilaurate and 0.2 g of hydroquinone monomethylether were added thereto, and the mixture was heated to 75° C. under air atmosphere. After reacting the mixture at 75 to 80° C. for 4 hours, the solvent was substituted with IPA to adjust a solid content concentration to 20%. The reaction content was transferred to a 1 l autoclave, and was heated to 50° C., and methyl chloride was introduced so as to make a gage pressure of 1 to 1.6 kg, and the mixture was reacted for 6 hours while maintaining the pressure to effect quaternization. After returning the temperature to room temperature, the pressure was returned to normal pressure, and the mixture was heated to 70° C. under air atmosphere to remove an excess methyl chloride. Thereafter, after returning the temperature to room temperature, 10 g of an amino group-containing polydimethylsiloxane (TSF4700, manufactured by GE Toshiba Silicones Co., Ltd.) was added to the mixture, and the mixture was heated to 80° C. under air atmosphere and was maintained at that temperature for 1 hour. Thereafter, the mixture was cooled to room temperature to obtain a polymer having a solid content of 29% (antistatic polymer 6).

REFERENCE EXAMPLE 15

Preparation of a Quaternary Ammonium Salt Group Structure-Containing Polymer 65 g of dimethylaminoethyl methacrylate, 10 g of bis-mercaptopolydimethylsiloxane (X-22-167B, manufactured by Shin-Etsu Chemical Co., Ltd.), 20 g of 2-ethylhexyl methacrylate, 5 g of HEMA and 300 g of MEK were mixed with stirring, and 1 g of V65 was added thereto, and the mixture was heated to 65° C. in a nitrogen stream and was maintained at that temperature for 5 hours (about 1 g of V65 was additionally added during the reaction). Thereafter, the inside temperature was raised to 75 to 80° C. and was maintained for 2 hours to completely decompose the remaining V65. After stirring the temperature to room temperature, 100 g of the above obtained isocyanate 1 was added, and 0.1 g of dibutyltin dilaurate and 0.2 g of hydroquinone monomethyl ether were added to the mixture, and the mixture was heated to 75° C. under air atmosphere. After reacting the mixture at 75 to 80° C. for 4 hours, the solvent was replaced by IPA to adjust a solid content concentration to 20%. The inside content was transferred to a 1 l autoclave and was heated to 50° C., and methyl chloride was introduced so as to make a gage pressure of 1 to 1.6 kg, and the mixture was reacted for 6 hours while maintaining the pressure to effect quaternization. After returning the temperature to room temperature, the pressure was returned to normal pressure, and the mixture was heated to 70° C. under air atmosphere to remove an excess methyl chloride. After cooling the mixture to room temperature, a polymer having a solid content of 25% was obtained (antistatic polymer 7).

TABLE B

| Number average molecular weight of antistatic polymer 1 to 7 (*1) | |
|---|---|
| antistatic polymer 1 | $1.5 \times 10^4$ |
| antistatic polymer 2 | (*2) |
| antistatic polymer 3 | (*2) |
| antistatic polymer 4 | $1.7 \times 10^4$ |
| antistatic polymer 5 | $2.0 \times 10^4$ |
| antistatic polymer 6 | (*2) |
| antistatic polymer 7 | $1.5 \times 10^4$ |

(*1) Molecular weights are one of polymers before quaternization and introduction of acryloyl group. Number average molecular weights were determined by GPC using polystyrene as a standard probe.
(*2) Not determined. However, it can be said that those polymers have same degree of molecular weights as others determined.

REFERENCE EXAMPLE 16

Preparation of a Quaternary Ammonium Salt Group Structure-Containing Silane Coupling Agent 103 g of N,N-dimethylaminopropanol, 247 g of triethoxysilylpropylisocyanate (KBE9007, manufactured by Shin-Etsu Chemical Co., Ltd.), 500 g of MEK and 1 g of dibutylthin dilaurate were mixed with stirring while maintaining a temperature at most 25° C. Thereafter, the mixture was heated to 75 to 80° C. under air atmosphere and was maintained at that temperature for 4 hours. After confirming disappearance of the NCO group in accordance with IR, 103 g of methyl monochloroacetate (0.95 mol to 1 mol of N,N-dimethylaminopropanol) and 500 g of IPA were added to the reaction mixture, and the mixture was gradually heated to 60° C. and was maintained at that temperature for 8 hours to effect quaternization. Thereafter, the mixture was cooled to room temperature to obtain a quaternary ammonium salt group structure-containing silane coupling agent having a solid content of 32% (antistatic silane coupling agent 1).

REFERENCE EXAMPLE 17

Preparation of Hydrolysis Condensate of a Quaternary Ammonium Salt Group Structure-Containing Silane Coupling Agent 1.2 g of acetylacetonealuminum and 2.4 g of water were added to 100 g of the above obtained antistatic silane coupling agent 1 (solid content 32%), and after reacting the mixture at 25° C. for 3 hours, the mixture was heated to 50 to 70° C. and was reacted at that temperature for 4 hours. Thereafter, the mixture was cooled to room temperature to obtain a hydrolysis condensate of a quaternary ammonium salt group structure-containing silane coupling agent having a solid content of 34% (antistatic silane coupling agent 2).

TABLE C

| Molecular weight of antistatic silane coupling agent 1 and 2(*1) | |
|---|---|
| antistatic silane coupling agent 1 | 458 |
| antistatic silane coupling agent 2 | >458(*2) |

(*1)Molecular weights are calculated based on atomic weights of the atoms composing the antistatic silane coupling agent.
(*2)Not determined. However, it is clear that the molecular weight is larger than that of the antistatic silane coupling agent 1 because the antistatic silane coupling agent 1 is used as a raw material.

REFERENCE EXAMPLE 18

Reaction of a Colloidal Silica and a Silane Coupling Agent Having a Polyfunctional Acryloyl Group 444 g of an organosilica sol dispersed in MEK (MEK-ST, manufactured by Nissan Chemical Industries, Ltd., primary particle size=10–20 nm (average particle size by BET method, value disclosed in catalogue), 30% MEK solution), 400 g of the above obtained silane coupling agent 1, 0.4 g of hydroquinone monomethyl ether and 4 g of acetylacetone aluminum were fully stirred and mixed, and 8 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation (treated colloidal silica 1). Component (A)/Component (C)= 46/54 (weight ratio).

REFERENCE EXAMPLE 19

Reaction of a Colloidal Silica and a Polyalkylene Glycol Chain-Containing Silane Coupling Agent Having a Methacryloyl Terminal Group 444 g of an organosilica sol dispersed in MEK (MEK-ST, manufactured by Nissan Chemical Industries, Ltd.), 33 g of the above obtained silane coupling agent 2, 0.2 g of hydroquinone monomethyl ether and 1.1 g of acetylacetone aluminum were fully stirred and mixed, and 2.2 g of pure water was added thereto and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation (treated colloidal silica 2). Component (A)/Component (C)= 100/0 (weight ratio).

REFERENCE EXAMPLE 20

Reaction of a Colloidal Silica, a Silane Coupling Agent Having a Polyfunctional Acryloyl Group and a Polyalkylene Glycol Chain-Containing Silane Coupling Agent Having a Methacryl Terminal Group 444 g of an organosilica sol dispersed in MEK (MEK-ST, manufactured by Nissan Chemical Industries, Ltd.), 350 g of the above obtained silane coupling agent 1, 50 g of the above obtained silane coupling agent 2, 0.4 g of hydroquinone monomethyl ether and 4.5 g of acetylacetone aluminum were fully stirred and mixed, and 9 g of pure water was added thereto, and the mixture was continuously stirred at room temperature for at least 3 hours. Thereafter, the mixture was heated to 50 to 70° C. under air atmosphere, and continuously stirred at that temperature for at least 2 hours to have the silane coupling agents reacted with the surface of the silica sol to effect protective colloid-formation (treated colloidal silica 3). Component (A)/Component (C)= 64/36 (weight ratio).

REFERENCE EXAMPLE 21

Reaction of a Colloidal Silica and a Silane Coupling Agent Having a Polyfunctional Acryloyl Group 444 g of an organosilica sol dispersed in MEK (MEK-ST, manufactured by Nissan Chemical Industries, Ltd.), 770 g of the above obtained silane coupling agent 3 (mixture solution of a polyfunctional acryloyl group-containing silica coupling agent and an unreacted polyfunctional acrylate), 0.5 g of hydroquinone monomethyl ether and 4.1 g of acetylacetone aluminum were fully stirred and mixed, and 8.2 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation (treated colloidal silica 4). Component (A)/Component (C)=49/51 (weight ratio).

REFERENCE EXAMPLE 22

Reaction of a Colloidal Silica and a Silane Coupling Agent Having a Polyfunctional Acryloyl Group 400 g of an organosilica sol dispersed in MEK (MEK-ST, manufactured by Nissan Chemical Industries, Ltd.), 200 g of the above obtained silane coupling agent 4, 0.3 g of hydroquinone monomethyl ether and 4.5 g of acetylacetone aluminum were fully stirred and mixed, and 9 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation (treated colloidal silica 5). Component (A)/Component (C)= 64/36 (weight ratio).

REFERENCE EXAMPLE 23

Reaction of a Colloidal Silica and a Silane Coupling Agent Having a Polyalkylene Glycol Group 400 g of an organosilica sol dispersed in MEK (MEK-ST, manufactured by Nissan Chemical Industries, Ltd.), 100 g of the above obtained silane coupling agent 1 (polyalkylene glycol chain-containing silane coupling agent, solid content 100%) and 3.9 g of acetylacetone aluminum were fully stirred and mixed, and 7.7 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation. Thereafter, the solvent was replaced by propylene glycol monomethyl ether (hereinafter referred to as "PGM") (treated colloidal silica 6).

REFERENCE EXAMPLE 24

Reaction of a Colloidal Silica and a Silane Coupling Agent Having a COOCH$_3$ Group 400 g of an organosilica sol dispersed in MEK (MEK-ST, manufactured by Nissan Chemical Industries, Ltd.), 100 g of the above obtained silane coupling agent 2 (solid content 50%) and 3.8 g of acetylacetone aluminum were fully stirred and mixed, and 7.7 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation. Thereafter, the solvent was replaced by PGM (treated colloidal silica 7).

REFERENCE EXAMPLE 25

Reaction of a Colloidal Silica and a Silane Coupling Agent Having a Polycarboxylic Acid Ester Group 400 g of an organosilica sol dispersed in MEK (MEK-ST, manufactured by Nissan Chemical Industries, Ltd.), 70 g of the above obtained silane coupling agent 3 (solid content 100%) and 4.1 g of acetylacetone aluminum were fully stirred and mixed, and 8.1 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation. Thereafter, the solvent was replaced by PGM (treated colloidal silica 8).

REFERENCE EXAMPLE 26

Reaction of a Colloidal Silica and a Silane Coupling Agent Having a Long Chain Alkyl Group 400 g of an organosilica sol dispersed in MEK (MEK-ST, manufactured by Nissan Chemical Industries, Ltd.), 150 g of a silane coupling agent having a long chain alkyl group (reaction product of stearyl alcohol and triethoxysilylpropylisocyanate, solid content concentration 50%) and 3.9 g of acetylacetone aluminum were fully stirred and mixed, and 7.8 g of pure water was added thereto, and the mixture was continuously stirred at room temperature for 3 hours. Thereafter, the mixture was heated to 50 to 70° C. under air atmosphere, and was continuously stirred at that temperature for at least 2 hours to have the silane coupling agent reacted with the surface of the silica sol to effect protective colloid-formation (treated colloidal silica 9).

EXAMPLE 1

Preparation of a Composition Claimed in the Present Invention and its Evaluation A PGM solution (solid content concentration 60%) of the above obtained treated colloidal silica 1 was prepared by adding 1000 g of PGM to 300 g of the treated colloidal silica 1 (MEK solution: solid content 63%) and removing 985 g of a mixture of MEK and PGM by distillation. A coating composition was obtained by mixing and stirring 150 g of the solution thus prepared (solid content (ST1) 90 g; component (A) 41 parts by weight/Component (C) 49 parts by weight), 40 g of an antistatic polymer 1 solution (solid content (P1) 10 g, 10 parts by weight as Component (B)), 3 g (3 parts by weight as Component (D)) of a photopolymerization initiator (Irgacure 184, manufactured by Ciba Specialty Chemicals K.K.) and 60 g of PGM at room temperature for 1 hour. A weight ratio of PGM/IPA as a solvent was 80/20. Also, the finally obtained coating composition had a solid content concentration of 40 wt %.

A coating film was formed by using the above prepared coating composition in accordance with the following method, and was evaluated. The coating film was formed by coating the coating composition on a transparent (haze value 1.5%) biaxially oriented polyethylene terephthalate film having a thickness of 100 microns (T600E, manufactured by MITSUBISHI POLYESTER FILM CORPORATION) by a bar coater so as to provide a dry coating film thickness of about 5 microns and heat-drying the coating film at 80° C. for 2 minutes. The coating film thus obtained was irradiated with ultraviolet rays of 300 mJ/cm$^2$ at a position 15 cm lower than a light source of a high pressure mercury lamp having an output density of 120 W/cm, and the coating film thus obtained was evaluated in respect of transparency, antistatic properties, abrasion resistance, pencil hardness and coating film adhesion. The blending ratio of the composition is shown in Table 1 and the evaluation result is shown in Table 3.

EXAMPLES 2 to 20

Compositions in the claimed range of the present invention were prepared by using Components (A), (B), (C) and (D) in the same manner as in Example 1, and were evaluated. The blending ratios of respective compositions are shown in Table 1, and the evaluation results are shown in Table 2.

COMPARATIVE EXAMPLES 1 to 13

Preparation and Evaluation of Compositions not Included in the Claimed Range of the Present Invention Compositions not included in the claimed range of the present invention were prepared by using Components (B), (C) and (D), and coating films were prepared and evaluated in the same manner as in the above Examples. In Comparative Examples 1 to 5 and Comparative Examples 9 to 12, an organosilica sol dispersed in MEK was used in place of Component (A), and in Comparative Example 13, a silica alumina sol dispersed in water replaced by an ethanol solvent was used. In Comparative Examples 6 to 8, there was employed no substitute for Component (A).

The blending ratios of respective compositions are shown in Table 1, and the evaluation results are shown in Table 3.

In Comparative Examples 2, 3, 4 and 5, agglomerations were caused and homogeneous compositions could not be obtained, and in Comparative Examples 1 and 6 to 13, transparency, antistatic properties, hardness (flaw resistance) and the like were worse as compared with the Examples of the present invention.

EXAMPLE 21

Preparation and Evaluation of Composition in the Claimed Range of the Present Invention A PGM solution (solid content concentration 50%) of the above obtained treated colloidal silica 6 was prepared by adding 600 g of PGM to 500 g of the treated colloidal silica 6 (MEK solution: solid content 43%) and removing 670 g of a mixture of MEK and PGM by distillation. A coating composition was obtained by mixing and stirring 40 g of the solution thus prepared (solid content (ST1): 40 g, 20 parts by weight as Component (A)), 40 g of a solution of the above obtained antistatic polymer 1 (solid content (P1): 10 g, 10 parts by weight as Component (B)), 70 g of dipentaerythritol (penta/hexa)acrylate (KAYARAD DPHA, manufactured by Nippon Kayaku Co., Ltd.) (70 parts by weight as Component (C)), 3 g of a photopolymerization initiator (Irgacure 184, manufactured by Ciba Specialty Chemicals K.K.) (3 parts by weight as Component (D)) and 60 g of PGM at room temperature for 1 hour. A weight ratio of PGM/IPA as a solvent is 80/20. The finally obtained coating composition had a solid content concentration of 40 wt %.

A coating film was formed by using the above prepared composition in accordance with the following method, and was evaluated. The coating film was formed by coating the above prepared composition on a transparent (haze value 1.5%) biaxially oriented polyethylene terephthalate film (T600E, manufactured by MITSUBISHI POLYESTER FILM CORPORATION) having a thickness of 100 microns by a bar coater so as to provide a dry film thickness of about 5 microns and heat-drying at 80° C. for 2 minutes. The coating film thus obtained was irradiated with ultraviolet rays of 300 mJ/cm$^2$ at a position 15 cm lower than a light source of a high pressure mercury lamp having an output density of 120 W/cm, and was evaluated in respect of transparency, antistatic properties, abrasion resistance, pencil hardness and coating film adhesion. The blending ratio of the composition is shown in Table 2, and the evaluation result is shown in Table 4.

EXAMPLES 22 to 39

Compositions in the claimed range of the present invention were prepared by using Components (A), (B), (C) and (D) and were evaluated in the same manner as in Example 21.

The blending ratios of respective compositions are shown in Table 2, and the evaluation results are shown in Table 4.

COMPARATIVE EXAMPLES 14 to 26

Preparation and Evaluation of Compositions not Included in the Claimed Range of the Present Invention Compositions not included in the claimed range of the present invention were prepared by using Components (B), (C) and (D) and coating films were formed and evaluated in the same manner as in the Examples of the present invention. In Comparative Examples 14 to 18 and Comparative Examples 22 to 25, an organosilica sol dispersed in MEK was used in place of Component (A), and in Comparative Example 26, an organosilica sol dispersed in MEK (ST9) obtained by reacting a silane coupling agent not included in the claimed range of the present invention was employed in place of Component (A). Also, in Comparative Examples 19 to 21, there was employed no substitute for Component (A).

The blending ratios of respective compositions are shown in Table 2, and the evaluation results are shown in Table 4.

In Comparative Examples 15, 16, 17 and 18, agglomerations were caused and homogeneous compositions could not be obtained, and in Comparative Examples 14 and 19 to 26, transparency, antistatic properties, hardness (flaw resistance) and the like were worse as compared with the Examples of the present invention. Particularly, the silica sol dispersed in a solvent of Comparative Example 14 provided poor performances in respect of haze and hardness, and as illustrated in Comparative Examples 19 to 21, when there is employed no silica component, hardness (flaw resistance) becomes poor.

Various properties of a coating film were evaluated in the following manner.

(1) Transparency:

Transparency was evaluated by a haze value (JIS K-7105).

(2) Abrasion Resistance:

Abrasion resistance was evaluated by a difference ΔH100 (%) between a haze value after a 100 rotation Taber abrasion test using an abrasion ring (CS-10F, manufactured by Calibrase Co., Ltd.) under a load of 500 g and a haze value before the Taber abrasion test. Abrasion resistance was also evaluated by a haze value difference ΔH500 (%) before and after a 500 rotation Taber abrasion test under a load of 500 g.

(3) Pencil Hardness:

Pencil hardness was measured by using a JIS standard pencil hardness meter (manufactured by Taiyu Kizai K.K.) in accordance with JIS K-5400, and was expressed by the hardest pencil number which does not cause flaw or mark.

(4) Surface Resistivity:

A sample was placed in a constant temperature room of 23° C. having a relative humidity of 65% for 24 hours, and surface resistivity of the sample was measured by using a resistivity-measuring apparatus (TR-8601 type, manufactured by Takeda Riken K.K.) at an applied voltage of 100V for 1 minute.

(5) Coating Film Adhesion:

Coating film adhesion was evaluated by a cross-cut adhesion test in accordance with JIS K5400 (100 pieces of cross-cuts of 1 mm were made and were tried to be peeled with an adhesive cellophane tape (manufactured by Nichiban Co., Ltd.)). The evaluation test was repeated 5 times (a fresh adhesive cellophane tape was used each time), and a sample causing no peeling was expressed by a symbol ○, and a sample having at most 10% of the cross-cuts peeled was expressed by a symbol Δ, and a sample having more than 10% of the cross-cuts peeled was expressed by a symbol x.

TABLE 1

| Ex. | Treated silica sol (Component (A) + Component (C) | Other additional Component (C) | Component (B) | Component (D) | Other Component | Solvent |
|---|---|---|---|---|---|---|
| Ex. 1 | ST1 90 | — | P1 10 | I184 3 | — | PGM/IPA |
| Ex. 2 | ST1 90 | — | P2 10 | I184 3 | — | PGM/IPA |
| Ex. 3 | ST1 90 | — | P3 10 | I184 3 | — | PGM/IPA |
| Ex. 4 | ST1 90 | — | P4 10 | I184 3 | — | PGM/IPA |
| Ex. 5 | ST1 90 | — | P5 10 | I184 3 | — | PGM/IPA |
| Ex. 6 | ST1 90 | — | P6 10 | I184 3 | — | PGM/IPA |
| Ex. 7 | ST1 90 | — | P7 10 | I184 3 | — | PGM/IPA |
| Ex. 8 | ST1 90 | — | SC1 10 | I184 3 | — | PGM/IPA |
| Ex. 9 | ST1 90 | — | SC2 10 | I184 3 | — | PGM/IPA |
| Ex. 10 | ST2 30 | DPHA 50 | P7 10 | I184 3 | — | PGM/IPA |
| Ex. 11 | ST3 88 | — | P7 12 | I184 3 | — | PGM/IPA |
| Ex. 12 | ST4 40 | DPHA 50 | P7 10 | I184 3 | — | PGM/IPA |
| Ex. 13 | ST5 40 | DPHA 50 | P7 10 | I184 3 | — | PGM/IPA |
| Ex. 14 | ST3 90 | — | P7 10 + DQ100 2 | I184 3 | — | PGM/IPA |
| Ex. 15 | ST3 90 | — | P7 10 + TBT 1 | I184 3 | — | PGM/IPA |
| Ex. 16 | ST3 90 | — | P7 10 + ATM35E 3 | I184 3 | — | PGM/IPA |
| Ex. 17 | ST3 90 | — | P7 10 + m-MS51 5 | I184 3 | — | PGM/IPA |
| Ex. 18 | ST2 30 | DPHA 40 | P7 15 | I184 3 | PMMA 15 | PGM/IPA |
| Ex. 19 | ST2 20 | DPHA 70 | P7 10 | I184 3 | — | PGM/IPA |
| Ex. 20 | ST1 85 | — | P7 15 | I184 3 | — | PGM/IPA |

| Ex. | Component (A) | Component (C) | Component (B) | Component (D) | Other Component | Solvent |
|---|---|---|---|---|---|---|
| Comp. Ex. 1 | — | DPHA 60 | DQ100 10 | I184 3 | MEKST 30 | PGM/IPA |
| Comp. Ex. 2 | — | DPHA 60 | P7 10 | I184 3 | MEKST 30 | PGM/IPA |
| Comp. Ex. 3 | — | DPHA 60 | Sc1 10 | I184 3 | MEKST 30 | PGM/IPA |
| Comp. Ex. 4 | — | DPHA 60 | P7 10 + m-MS51 5 | I184 3 | MEKST 30 | PGM/IPA |

TABLE 1-continued

| Ex. | Component (A) | Component (C) | Component (B) | Component (D) | Other Component | Solvent |
|---|---|---|---|---|---|---|
| Comp. Ex. 5 | — | DPHA 70 | P7 10 + m-MS51 20 | I184 3 | MEKST 20 | PGM/IPA |
| Comp. Ex. 6 | — | DPHA 90 | DQ100 10 | I184 3 | — | PGM/IPA |
| Comp. Ex. 7 | — | DPHA 90 | P7 10 | I184 3 | — | PGM/IPA |
| Comp. Ex. 8 | — | DPHA 90 | SC1 10 | I184 3 | — | PGM/IPA |
| Comp. Ex. 9 | — | DPHA 60 | TBT 1 | I184 3 | MEKST 30 | PGM/IPA |
| Comp. Ex. 10 | — | DPHA 60 | TBT 10 | I184 3 | MEKST 30 | PGM/IPA |
| Comp. Ex. 11 | — | DPHA 60 | ATM35E 10 | I184 3 | MEKST 30 | PGM/IPA |
| Comp. Ex. 12 | — | DPHA 60 | m-MS51 10 | I184 3 | MEKST 30 | PGM/IPA |
| Comp. Ex. 13 | — | DPHA 60 | SC1 10 | I184 3 | ST-AK*30 | PGM/EtOH |

TABLE 2

| Ex. | Component (A) | Component (C) | Component (B) | Component (D) | Solvent |
|---|---|---|---|---|---|
| Ex. 21 | ST6 20 | DPHA 70 | SC1 10 | I184 3 | PGM/IPA |
| Ex. 22. | ST7 20 | DPHA 70 | SC1 10 | I184 3 | PGM/IPA |
| Ex. 23 | ST8 20 | DPHA 70 | SC1 10 | I184 3 | PGM/IPA |
| Ex. 24 | ST6 20 | DPHA 65 | SC1 15 | I184 3 | PGM/IPA |
| Ex. 25 | ST6 25 | DPHA 65 | SC2 10 | I184 3 | PGM/IPA |
| Ex. 26 | ST6 30 | DPHA 60 | P1 10 | I184 3 | PGM/IPA |
| Ex. 27 | ST6 30 | DPHA 60 | P2 10 | I184 3 | PGM/IPA |
| Ex. 28 | ST6 30 | DPHA 60 | P3 10 | I184 3 | PGM/IPA |
| Ex. 29 | ST6 30 | DPHA 60 | P4 10 | I184 3 | PGM/IPA |
| Ex. 30 | ST6 30 | DPHA 60 | P5 10 | I184 3 | PGM/IPA |
| Ex. 31 | ST6 30 | DPHA 60 | P6 10 | I184 3 | PGM/IPA |
| Ex. 32 | ST6 30 | DPHA 60 | P7 10 | I184 3 | PGM/IPA |
| Ex. 33 | ST6 30 | DPHA 60 | SC1 10 + DQ100 2 | I184 3 | PGM/IPA |
| Ex. 34 | ST6 30 | DPHA 60 | SC1 10 + TBT 10 | I184 3 | PGM/IPA |
| Ex. 35 | ST6 30 | DPHA 60 | SC1 10 + m-MS5 10 | I184 3 | PGM/IPA |
| Ex. 36 | ST6 30 | DPHA 60 | SC1 10 + ATM35E 5 | I184 3 | PGM/IPA |
| Ex. 37 | ST6 30 | DPHA 55 | SC1 15 | I184 3 | PGM/IPA |
| Ex. 38 | ST6 30 | DPHA 50 | SC1 20 | I184 3 | PGM/IPA |
| Ex. 39 | ST6 20 | DPHA 65 | P7 15 | I184 3 | PGM/IPA |

| Ex. | Component (A) | Component (C) | Component (B) | Component (D) | Other Component | Solvent |
|---|---|---|---|---|---|---|
| Comp. Ex. 14 | — | DPHA 60 | DQ100 10 | I184 3 | MEKST 30 | PGM/IPA |
| Comp. Ex. 215 | — | DPHA 60 | P1 10 | I184 3 | MEKST 30 | PGM/IPA |
| Comp. Ex. 16 | — | DPHA 60 | SC1 10 | I184 3 | MEKST 30 | PGM/IPA |
| Comp. Ex. 17 | — | DPHA 60 | P1 10 + mMS51 5 | I184 3 | MEKST 30 | PGM/IPA |
| Comp. Ex. 18 | — | DPHA 70 | P1 10 + mMS51 20 | I184 3 | MEKST 20 | PGM/IPA |
| Comp. Ex. 19 | — | DPHA 90 | DQ100 10 | I184 3 | — | PGM/IPA |
| Comp. Ex. 20 | — | DPHA 90 | P1 10 | I184 3 | — | PGM/IPA |
| Comp. Ex. 21 | — | DPHA 90 | SC1 10 | I184 3 | — | PGM/IPA |
| Comp. Ex. 22 | — | DPHA 60 | TBT 1 | I184 3 | MEKST 30 | PGM/IPA |
| Comp. Ex. 23 | — | DPHA 60 | TBT 10 | I184 3 | MEKST 30 | PGM/IPA |
| Comp. Ex. 24 | — | DPHA 60 | ATM35E 10 | I184 3 | MEKST 30 | PGM/IPA |

TABLE 2-continued

| | | | | | | |
|---|---|---|---|---|---|---|
| Comp. Ex. 25 | — | DPHA 60 | mMS51 10 | I184 3 | MEKST 30 | PGM/IPA |
| Comp. Ex. 26 | — | DPHA 60 | SC1 10 | I184 3 | ST9 30 | PGM/IPA |

Marks and abbreviations in the above TABLES 1 and 2 are illustrated below.

ST1 to ST9: Treated colloidal silicas 1 to 9 and their blended amounts (solid contents)

MEKST: Organosilica sol dispersed in MEK (MEK-ST) manufactured by Nissan Chemical Industries, Ltd., and their blended amounts (solid contents)

ST-AK*: Silica-alumina sol dispersed in water (ST-AK) substituted with an ethanol solvent, manufactured by Nissan Chemical Industries, Ltd., and its blended amount (solid content)

DPHA: Dipentaerythritol (penta/hexa)acrylate, manufactured by Nippon Kayaku Co., Ltd.

P1 to P7: Antistatic polymers 1 to 7, and their blended amounts (solid contents)

SC1 to SC2: Antistatic silane coupling agents 1 to 2, and their blended amounts (solid contents)

DQ100: β-methacryloyl oxyethyltrimethylammonium chloride manufactured by Kyoeisha Chemical Co., Ltd.

TBT: Tetrabutoxytitanium

ATM35E: Pentaerythritol-35EO adducted tetraacrylate manufactured by Shin-Nakamura Chemical Co., Ltd.

m-MS51: Hydrolysis condensate of MS51 (tetramethylsilane oligomer) manufactured by Mitsubishi Chemical Corporation PMMA: Polymethyl methacrylate (IPA solution obtained by adding 0.5 g of V65 to 100 g of MMA and 300 g of IPA and polymerizing at 65° C. for 5 hours (0.5 g of V65 was additionally added during the reaction) and further polymerizing at 80° C. for 2 hours), and their blended amounts (solid contents)

I184: Irgacure 184, manufactured by Ciba Specialty Chemicals K. K.

PGM/IPA: Propylene glycol monomethyl ether/isopropyl alcohol mixture (mixing weight ratio = 80/20)

PGM/EtOH: Propylene glycol monomethyl ether/ethanol mixture (mixing weight ratio = 50/50)

TABLE 3

| Ex. | Presence or absence of agglomeration in liquid | Presence or absence of agglomeration in coating film formation | Haze | Surface resistivity | Flaw resistance ΔH100 | Flaw resistance ΔH500 | Pencil hardness | Coating film adhesion |
|---|---|---|---|---|---|---|---|---|
| Ex. 1 | ○ | ○ | 1.5 | $5 \times 10^9$ | 2.3 | — | 3H | ○ |
| Ex. 2 | ○ | ○ | 1.5 | $4 \times 10^9$ | 2.3 | — | 3H | ○ |
| Ex. 3 | ○ | ○ | 1.5 | $6 \times 10^8$ | 2.3 | — | 3H | ○ |
| Ex. 4 | ○ | ○ | 1.5 | $7 \times 10^9$ | 2.5 | — | 3H | ○ |
| Ex. 5 | ○ | ○ | 1.5 | $8 \times 10^9$ | 2.3 | — | 3H | ○ |
| Ex. 6 | ○ | ○ | 1.5 | $8 \times 10^9$ | 2.2 | — | 3H | ○ |
| Ex. 7 | ○ | ○ | 1.5 | $5 \times 10^8$ | 2.1 | 5.4 | 3H | ○ |
| Ex. 8 | ○ | ○ | 1.5 | $5 \times 10^9$ | 2.4 | 8.4 | 3H | ○ |
| Ex. 9 | ○ | ○ | 1.5 | $7 \times 10^9$ | 2.2 | — | 3H | ○ |
| Ex. 10 | ○ | ○ | 1.5 | $5 \times 10^8$ | 2.4 | — | 3H | ○ |
| Ex. 11 | ○ | ○ | 1.5 | $3 \times 10^8$ | 2.3 | — | 3H | ○ |
| Ex. 12 | ○ | ○ | 1.5 | $5 \times 10^8$ | 2.2 | — | 3H | ○ |
| Ex. 13 | ○ | ○ | 1.5 | $7 \times 10^8$ | 2.1 | — | 3H | ○ |
| Ex. 14 | ○ | ○ | 1.5 | $5 \times 10^8$ | 2.4 | — | 3H | ○ |
| Ex. 15 | ○ | ○ | 1.6 | $3 \times 10^8$ | 2.5 | — | 3H | ○ |
| Ex. 16 | ○ | ○ | 1.6 | $4 \times 10^8$ | 2.2 | — | 3H | ○ |
| Ex. 17 | ○ | ○ | 1.6 | $5 \times 10^8$ | 2.3 | — | 3H | ○ |
| Ex. 18 | ○ | ○ | 1.5 | $9 \times 10^8$ | 2.2 | — | 3H | ○ |
| Ex. 19 | ○ | ○ | 1.5 | $4 \times 10^8$ | 2.3 | 6.1 | 3H | ○ |
| Ex. 20 | ○ | ○ | 1.5 | $1 \times 10^8$ | 2.2 | — | 3H | ○ |
| Comp. Ex. 1 | Δ | Δ | 5 | $5 \times 10^{13}$ | 8.8 | 19.1 | 2H | Δ |
| Comp. Ex. 2 | X | Evaluation was impossible due to severe agglomeration | | | | | | |
| Comp. Ex. 3 | X | Evaluation was impossible due to severe agglomeration | | | | | | |
| Comp. Ex. 4 | X | Evaluation was impossible due to severe agglomeration | | | | | | |
| Comp. Ex. 5 | X | Evaluation was impossible due to severe agglomeration | | | | | | |
| Comp. Ex. 6 | ○ | ○ | 1.9 | $9 \times 10^9$ | 7.8 | 28.8 | 2H | Δ |
| Comp. Ex. 7 | ○ | ○ | 6 | $1 \times 10^8$ | 4.5 | 15.8 | 2H | ○ |
| Comp. Ex. 8 | ○ | ○ | 1.8 | $1 \times 10^9$ | 5.5 | — | 2H | ○ |
| Comp. Ex. 9 | ○ | ○ | 1.8 | $5 \times 10^{15}$ | 3.8 | — | 2H | ○ |
| Comp. Ex. 10 | ○ | ○ | 2 | $5 \times 10^{13}$ | 3.5 | — | 2H | ○ |
| Comp. Ex. 11 | ○ | ○ | 5 | $5 \times 10^{14}$ | 3.3 | — | 2H | Δ |
| Comp. Ex. 12 | ○ | ○ | 2.5 | $5 \times 10^{13}$ | 4.5 | — | 2H | Δ |
| Comp. Ex. 13 | Δ | Δ | 20 | $7 \times 10^9$ | 10 | — | 2H | X |

TABLE 4

| Ex. | Presence or absence of agglomeration in liquid | Presence or absence of agglomeration in coating film formation | Haze | Surface resistivity | Flaw resistance ΔH100 | Flaw resistance ΔH500 | Pencil hardness | Coating film adhesion |
|---|---|---|---|---|---|---|---|---|
| Ex. 21 | ○ | ○ | 1.5 | $5 \times 10^9$ | 2.7 | — | 3H | ○ |
| Ex. 22 | ○ | ○ | 1.7 | $7 \times 10^9$ | 2.6 | — | 3H | ○ |
| Ex. 23 | ○ | ○ | 1.7 | $7 \times 10^9$ | 2.6 | — | 3H | ○ |
| Ex. 24 | ○ | ○ | 1.5 | $3 \times 10^9$ | 2.8 | — | 3H | ○ |
| Ex. 25 | ○ | ○ | 1.5 | $8 \times 10^9$ | 2.9 | — | 3H | ○ |
| Ex. 26 | ○ | ○ | 1.5 | $8 \times 10^8$ | 2.4 | — | 3H | ○ |
| Ex. 27 | ○ | ○ | 1.5 | $7 \times 10^8$ | 2.3 | — | 3H | ○ |
| Ex. 28 | ○ | ○ | 1.5 | $5 \times 10^8$ | 2.3 | — | 3H | ○ |
| Ex. 29 | ○ | ○ | 1.5 | $5 \times 10^8$ | 2.3 | — | 3H | ○ |
| Ex. 30 | ○ | ○ | 1.5 | $6 \times 10^8$ | 2.4 | — | 3H | ○ |
| Ex. 31 | ○ | ○ | 1.5 | $5 \times 10^8$ | 2.2 | — | 3H | ○ |
| Ex. 32 | ○ | ○ | 1.5 | $7 \times 10^9$ | 2.3 | 8.1 | 3H | ○ |
| Ex. 33 | ○ | ○ | 1.5 | $5 \times 10^9$ | 2.7 | — | 3H | ○ |
| Ex. 34 | ○ | ○ | 1.6 | $3 \times 10^9$ | 2.8 | — | 3H | ○ |
| Ex. 35 | ○ | ○ | 1.6 | $4 \times 10^9$ | 2.8 | — | 3H | ○ |
| Ex. 36 | ○ | ○ | 1.6 | $5 \times 10^9$ | 2.6 | — | 3H | ○ |
| Ex. 37 | ○ | ○ | 1.5 | $9 \times 10^9$ | 2.5 | — | 3H | ○ |
| Ex. 38 | ○ | ○ | 1.5 | $2 \times 10^9$ | 2.9 | — | 3H | ○ |
| Ex. 39 | ○ | ○ | 1.5 | $3 \times 10^8$ | 2.9 | — | 3H | ○ |
| Comp. Ex. 14 | Δ | Δ | 5 | $5 \times 10^{13}$ | 8.8 | — | 2H | Δ |
| Comp. Ex. 15 | x | Evaluation was impossible due to severe agglomeration | | | | | | |
| Comp. Ex. 16 | x | Evaluation was impossible due to severe agglomeration | | | | | | |
| Comp. Ex. 17 | x | Evaluation was impossible due to severe agglomeration | | | | | | |
| Comp. Ex. 18 | x | Evaluation was impossible due to severe agglomeration | | | | | | |
| Comp. Ex. 19 | ○ | ○ | 1.9 | $9 \times 10^9$ | 7.8 | — | 2H | Δ |
| Comp. Ex. 20 | ○ | ○ | 6 | $1 \times 10^8$ | 4.5 | — | 2H | ○ |
| Comp. Ex. 21 | ○ | ○ | 1.8 | $1 \times 10^9$ | 5.5 | — | 2H | ○ |
| Comp. Ex. 22 | ○ | ○ | 1.8 | $5 \times 10^{15}$ | 3.8 | — | 2H | ○ |
| Comp. Ex. 23 | ○ | ○ | 2 | $5 \times 10^{13}$ | 3.5 | — | 2H | ○ |
| Comp. Ex. 24 | ○ | ○ | 5 | $5 \times 10^{14}$ | 3.3 | — | 2H | Δ |
| Comp. Ex. 25 | ○ | ○ | 2.5 | $5 \times 10^{13}$ | 4.5 | — | 2H | Δ |
| Comp. Ex. 26 | ○ | ○ | 3 | $7 \times 10^{14}$ | 6.2 | — | 2H | Δ |

EXAMPLE 40

The same experiment was repeated as in Example 11 except that a substrate to be coated is replaced by a triacetyl cellulose (TAC) film (standard grade, thickness 100 microns, haze of substrate=0.4%, manufactured by FUJIFILM BUSINESS SUPPLY Co., LTD.).

As this result, a coating film excellent in transparency, resistivity value and flaw resistance (haze=0.4%, surface resistivity $4\times10^8$, flaw resistance 2.6, pencil hardness 2H and adhesion ○) was obtained.

EXAMPLE 41

The same experiment was repeated as in Example 11, except that a substrate to be coated was replaced by a polycarbonate board (Iupilon NF2000, thickness 2 mm, haze of substrate=0.1%, manufactured by Mitsubishi Engineering-Plastics Corporation).

As this result, a coating film excellent in transparency, resistivity value and flaw resistance (haze=0.4%, surface resistivity $1\times10^9$, flaw resistance 2.3, pencil hardness F and adhesion ○) was obtained.

COMPARATIVE EXAMPLE 27

400 g of organosilica sol dispersed in MEK (MEK-ST manufactured by Nissan Chemical Industries, Ltd.), 30 g of methacryloxypropyltrimethoxysilane (KBM503, molecular weight 248, manufactured by Shin-Etsu Chemical Co., Ltd.) 0.3 g of hydroquinone monomethyl ether and 3.2 g of acetylacetone aluminum were fully mixed with stirring, and 6.5 g of pure water was added thereto, and the mixture was continuously stirred at room temperature for at least 3 hours. Thereafter, the mixture was heated to 50 to 70° C. under air atmosphere, and was continuously stirred at that temperature for at least 2 hours, and the silane coupling agent was reacted with the surface of the silica sol (treated colloidal silica 10).

60 parts of DPHA and 30 parts of treated colloidal silica 10 (solid content) were fully mixed, and the solvent was replaced by PGM, and an IPA solution of P7 (10 parts of P7 as a solid content), 3 parts of Irgacure 184 and PGM in such an amount as to provide a solid content concentration of 40% were mixed, but the treated colloidal silica was agglomerated and a homogeneous solution could not be obtained. Therefore, a protective colloid could not be sufficiently formed simply by treating a surface with a silane coupling agent of low molecular weight having a double bond, and the same effect as in the present invention could not be obtained. Thus, it was proved that it was effective to use a silane coupling agent having a double bond, which has such a specific molecular weight as claimed in the present invention.

EXAMPLE 42

The same experiment was repeated as in Example 31, except that a substrate to be coated was replaced by a triacetyl cellulose (TAC) film (standard grade, thickness 100 microns, haze of substrate=0.4%, manufactured by FUJIFILM BUSINESS SUPPLY Co., LTD.). As this result, a coating film excellent in transparency, resistivity value and flaw resistance (haze=0.4%, surface resistivity value $7 \times 10^8$, flaw resistance 2.6, pencil hardness 2H and adhesion ◯) was obtained.

EXAMPLE 43

The same experiment was repeated as in Example 31, except that a substrate to be coated was replaced by a polycarbonate board (Iupilon NF2000, thickness 2 mm, haze of substrate=0.1%, manufactured by Mitsubishi Engineering-Plastics Corporation). A coating film excellent in transparency, resistivity value and flaw resistance (haze= 0.4%, surface resistivity value $7 \times 10^9$, flaw resistance 2.8, pencil hardness F and adhesion ◯) was obtained.

COMPARATIVE EXAMPLE 28

400 g of an organosilica sol dispersed in MEK (MEK-ST manufactured by Nissan Chemical Industries, Ltd.). 30 g of vinyl trimethoxysilane (KBM1003, molecular weight 148, manufactured by Shin-Etsu Chemical Co., Ltd.), 0.3 g of hydroquinone monomethyl ether and 5.3 g of acetylacetone aluminum were fully mixed with stirring, and 10.6 g of pure water was added thereto, and the mixture was continuously stirred at room temperature for 3 hours. Thereafter, the mixture was heated to 50 to 70° C. under air atmosphere, and was continuously stirred at that temperature for at least 2 hours, and the silane coupling agent was reacted with the surface of the silica sol (treated colloidal silica 11).

60 parts of DPHA and 30 parts (solid content) of treated colloidal silica 11 were fully mixed, and the solvent was replaced by PGM, and an IPA solution of P7 (10 parts of P7 as a solid content), 3 parts of Irgacure 184 and PGM in such an amount as to provide a solid content concentration of 40% were then mixed therewith, but the treated colloidal silica was agglomerated and a homogeneous solution could not be obtained. Thus, it was proved that the same effect as in the present invention cannot be obtained simply by treating a surface with a silane coupling agent having a low molecular weight and that such a silane coupling agent as claimed in the present invention is effective.

COMPARATIVE EXAMPLE 29

A coating film was formed under the same conditions as in Example 1, by using a mixture composition (solvent PGM/IPA, solid content concentration 35%) of 10 parts of a polymer obtained by adding a reaction product (NCO group-containing acrylate) of isophorone diisocyanate and pentaerythritol (tri/tetra)acrylate to a copolymer of dimethylaminoethyl methacrylate/2-ethylhexyl methacrylate/ hydroxyethyl methacrylate (60/30/10 weight ratio) and quaternizing with methyl chloride, 90 parts of DPHA and 3 parts of Irgacure 184 (1-hydroxycyclohexyl phenyl ketone), and was evaluated. The results are shown in the following Table 5.

COMPARATIVE EXAMPLE 30

A coating film was formed under the same conditions as in Example 1, by using a mixture composition (solvent isobutanol/IPA, solid content concentration 50%) of 10 parts of a polymer obtained by adding a reaction product (NCO group-containing acrylate) of isophorone diisocyanate and pentaerythritol (tri/tetra) acrylate to a copolymer of dimethylaminoethyl methacrylate/2-ethylhexyl methacrylate/ hydroxyethyl methacrylate (90/5/5 weight ratio), forming a quaternary ammonium salt group with methyl monochloroacetate and further adding an amino group-containing polysiloxane (TSF4700 manufactured by GE Toshiba Silicones Co., Ltd.) thereto, 70 parts of DPHA, 10 parts of dipentaerythritol tetraacrylate, 5 parts of pentaerythritol ethyleneoxide-adducted tetraacrylate (ATM4E manufactured by Shin-Nakamura Chemical Co., Ltd.) and 3 parts of Irgacure 907, and was evaluated. The results are shown in the following Table 5.

COMPARATIVE EXAMPLE 31

A coating film was formed under the same conditions as in Example 1, except for using an irradiated amount of 1,000 mJ/cm² and using a mixture of 90 g (solid content 27 g) of an organosilica sol dispersed in IPA (IPA-ST, primary particle size 10 to 20 nm (average particle size by BET method, value disclosed in a catalogue), 30% IPA dispersion, manufactured by Nissan Chemical Industries, Ltd.) (hereinafter referred to as "IPA-ST"), 20 g of dimethylmethoxysilane, 46 g of DPHA, 9 g of DQ100, 1 g of benzoinpropyl ether, 1 g of benzophenone, 2.5 g of 0.01N hydrochloric acid aqueous solution and 100 g of IPA, and was evaluated. The results are shown in the following Table 5.

COMPARATIVE EXAMPLE 32

A coating film was formed under the same conditions as in Example 1, except for using an irradiated amount of 1,000 mJ/cm² and using a mixture of solid content 35 g of IPA-ST (117 g including IPA), 10 g of dimethyldimethoxysilane, 50 g of DPHA, 6 g of DQ100, 1 g of benzoinpropyl ether, 1 g of benzophenone, 2.5 g of 0.01N hydrochloric acid aqueous solution and 100 g of IPA, and was evaluated. The results are shown in the following Table 5.

COMPARATIVE EXAMPLE 33

A silica sol was prepared by mixing 30 g of N-trimethoxypropyl-N,N,N-trimethylammonium chloride, solid content 60 g of IPA-ST (200 g including IPA) and 200 g of IPA, adding 9 g of 0.05N hydrochloric acid aqueous solution, stirring and reacting a quaternary ammonium salt group. 20 g of DPHA, 80 g of pentaerythritol (tri/tetra) acrylate and 3 g of Irgacure 184 were mixed with 90 g of the above prepared solution, and an insoluble material slightly produced was then removed by filtration to obtain a composition. A coating film was formed under the same conditions as in Example 1, by using the above obtained composition, and was evaluated. The results are shown in the following Table 5.

COMPARATIVE EXAMPLE 34

A silica sol was prepared by mixing solid content 30 g of AY43-021 (quaternary ammonium salt group-containing silane coupling agent manufactured by Toray Dow Corning Silicone Co., Ltd.) (60 g as AY43-021 solution), solid content 60 g of IPA-ST (200 g including IPA) and 200 g of IPA, adding 9 g of 0.05N-hydrochloric acid aqueous solution thereto and stirring the mixture to react a quaternary ammonium salt group. Solid content 40 g of the silica sol solution thus prepared, 100 g of pentaerythritol (tri/tetra) acrylate and 2 g of Irgacure 907 were mixed, and an insoluble material slightly produced was then removed by filtration to obtain a composition. A coating film was formed under the same conditions as in Example 1 by using the above prepared composition, and was evaluated. The results are shown in the following Table 5.

COMPARATIVE EXAMPLE 35

The same blending as in Comparative Example 31 was carried out, except that DQ100 was replaced by P-7, but the whole solution was agglomerated, and a uniform coating film could not be obtained while coating.

COMPARATIVE EXAMPLE 36

The same blending was carried out as in Comparative Example 31, except that DQ100 was replaced by SC1, but the solution was partly agglomerated, and a uniform coating film could not be obtained while coating.

COMPARATIVE EXAMPLE 37

100 g of a silica sol solution prepared in Comparative Example 33, P-7 solid content 10 g of P-7 solution, 20 g of DPHA, 80 g of pentaerythritol (tri/tetra) acrylate and 3 g of Irgacure 184 were mixed, but the whole solution was agglomerated, and a uniform coating film could not be obtained at the time of coating.

COMPARATIVE EXAMPLE 38

100 g of a silica sol solution prepared in Comparative Example 33, SC1 solid content 10 g of SC1 solution, 20 g of DPHA, 80 g of pentaerythritol (tri/tetra) acrylate and 3 g of Irgacure 184 were mixed, but the solution was partly agglomerated, and a uniform coating film could not be obtained at the time of coating.

TABLE 5

|  | Haze | Surface resistivity | Flaw resistance | |
| --- | --- | --- | --- | --- |
|  |  |  | $\Delta H_{100}$ | $\Delta H_{500}$ |
| Compartive Example 29 | 2.1 | $9 \times 10^8$ | 5.3 | 16.1 |
| Comparative Example 30 | 1.6 | $1 \times 10^{10}$ | 2.8 | 13.7 |
| Comparative Example 31 | 2.2 | $9 \times 10^{11}$ | 5.7 | 16.7 |
| Comparative Example 32 | 2.3 | $1 \times 10^{12}$ | 4.6 | 16.9 |
| Comparative Example 33 | 2.9 | $8 \times 10^{10}$ | 5.5 | 15.6 |
| Comparative Example 34 | 3.8 | $5 \times 10^{10}$ | 4.5 | 15.1 |

Flaw resistance: ΔH100 Haze value difference before and after 100 rotation Taber test
ΔH500 Haze value difference before and after 500 rotation Taber test
Comparative Example 35 Evaluation was impossible since a solution was agglomerated and a uniform coating film could not be obtained.
Comparative Example 36 Evaluation was impossible since a solution was agglomerated and a uniform coating film could not be obtained.
Comparative Example 37 Evaluation was impossible since a solution was agglomerated and a uniform coating film could not be obtained.
Comparative Example 38 Evaluation was impossible since a solution was agglomerated and a uniform coating film could not be obtained.

REFERENCE EXAMPLE 27

Preparation of Inorganic Oxide Fine Particles in which a Side Chain of (A) is a Silyl Ether Group Expressed by the Formula, —O—Si—R—S—P 3 parts of trimethoxysilylpropylmercaptan, 0.8 part of water and 0.03 part of acetyl acetone aluminum were added to 166.7 parts (solid content: 30%) of a silica sol containing propylene glycol monomethyl ether acetate as a dispersion medium, and the mixture was stirred to obtain a transparent solution. The amount of water added was 194% of such a theoretical amount as to hydrolyze 100% of trimethoxysilylpropylmercaptan. After allowing the mixture to stand at room temperature for 1 day, the mixture was reacted at 50° C. for 2 hours to obtain a silica sol having a mercapto group on the surface by hydrolysis condensation of trimethoxysilylpropylmercaptan and a silanol group on the silica sol surface.

A mixture of the above obtained silica sol solution having a mercapto group on the surface, 100 parts of glycidyl methacrylate and 240 parts of propylene glycol monomethyl ether acetate was heated to 80° C., and 0.3 part of azobisisobutylonitrile was added thereto respectively at the time of reaching 80° C. and 2 hours after reaching 80° C. The mixture was further reacted at 80° C. for 8 hours to obtain a polymer (solid content: 30%) having an epoxy group bonded to the silica sol by way of a sulfide group.

45.6 parts of acrylic acid, 106.4 parts of propylene glycol monomethyl ether acetate, 1 part of N,N-dimethylbenzyl amine and 0.2 part of p-methoxyphenol were added to the above obtained reaction product, and the mixture was reacted at 100° C. for 12 hours to introduce an acryloyl group of acrylic acid to the polymer by adding a carboxyl group of acrylic acid to an epoxy group. By this reaction, inorganic oxide fine particles (I) (solid content: 30%) having a structure wherein a polymer having an acryloyl group was bonded to a silica sol by way of a sulfide bond, was obtained.

EXAMPLE 44

60 parts (as a solid content) of the above obtained organic-inorganic composite (I), 30 parts of treated silica sol 1, 10 parts of antistatic polymer P7 and 3 parts of Irgacure 184 were mixed so as to obtain a homogeneous coating solution having a solid content of 30% by diluting with PGM. The coating solution thus obtained was coated on a PET film (T600E) so as to provide a dry film thickness of 7 microns by a bar coater, and was dried at 80° C., and was then cured by ultraviolet rays to obtain a hard coating film (irradiation amount 300 mJ/cm$^2$). Thereafter, the film was maintained under an environment of 23° C. and a relative humidity of 60% for 24 hours, and optical properties, antistatic properties, flaw resistance, pencil hardness and adhesion were evaluated.

As this result, performances were a haze value of 1.6%, a surface resistivity of 2×10$^9$, a flaw resistance of ΔH100= 2.9%, a pencil hardness of 3H and a coated film adhesion of ◯. Also, after drying, a satisfactory tack-free state could be obtained at the time before curing with ultraviolet rays, and an excellent film-formability could be confirmed. Further, the cured film did not cause any curling, and it was confirmed that a shrinkage by curing was reduced.

EXAMPLE 45

40 parts (as a solid content) of organic-inorganic composite (I), 50 parts (as a solid content) of treated silica sol 1, 10 parts of antistatic polymer P7 and 3 parts of Irgacure 184 were mixed to obtain a homogeneous coating solution having a solid content of 30% by diluting with PGM. The coating solution thus obtained was coated on a PET film (T600E) so as to provide a dry film thickness of 7 microns by a bar coater, and was dried at 80° C., and was then cured by ultraviolet rays to obtain a hard coating film (irradiation amount 300 mJ/cm$^2$). Thereafter, the film was maintained under an environment of 23° C. and a relative humidity of 60% for 24 hours, and optical properties, antistatic properties, flaw resistance, pencil hardness and adhesion were evaluated.

As this result, performances were a haze value of 1.5%, a surface resistivity of 4×10⁹, a flaw resistance of ΔH100= 2.5%, a pencil hardness of 3H and a coated film adhesion of ○. Also, after drying, a satisfactory tack-free state could be obtained at the time before curing with ultraviolet rays, and an excellent film-formability was confirmed. Further, the cured film did not cause any curling, and it was confirmed that a shrinkage by curing was reduced.

The antistatic coating composition of the present invention is a composition capable of forming a coating film excellent in antistatic properties and hardness. Particularly, a coating film excellent in antistatic properties, hardness (particularly flaw resistance), transparency, adhesion and the like can be obtained by combining (A) inorganic fine particles treated with a silane coupling agent having a radical-polymerizable functional group or a silane coupling agent having a specific polar functional group or a bulky structure polar group and having at least a specific molecular weight, (B) a quaternary ammonium salt group-containing polymer, a quaternary ammonium salt group-containing silane coupling agent or its condensate as an antistatic agent, and (C) a polyfunctional acrylic compound.

The entire disclosures of Japanese Patent Application No. 2001-311303 filed on Oct. 9, 2001, Japanese Patent Application No. 2001-324704 filed on Oct. 23, 2001 and Japanese Patent Application No. 2002-50831 filed on Feb. 27, 2002 including specifications, claims and summaries are incorporated herein by reference in their entireties.

Obviously, numerous modifications and variations of the present invention are possible in light of the above teachings. It is therefore to be understood that within the scope of the appended claims, the invention may be practiced otherwise than as specifically described herein.

What is claimed is:

1. An active energy ray-curable antistatic coating composition, which comprises:
   (A) fine inorganic oxide particles having a side chain having a molecular weight of at least 300 and having a functional group, (B) an antistatic agent containing at least one member selected from the group consisting of a quaternary ammonium salt group-containing polymer, a quaternary ammonium salt group-containing silane coupling agent and a hydrolysis condensate of the silane coupling agent, and (C) a polyfunctional (meth)acrylate having at least 3 (meth)acryloyl groups in a molecule.

2. The antistatic coating composition according to claim 1, wherein the functional group of (A) is a radical-polymerizable functional group.

3. An active energy ray-curable antistatic coating composition, which comprises:
   (A) fine inorganic oxide particles treated with a silane coupling agent having at least one polar group selected from the group consisting of a polyalkylene oxide, a carboxylic acid and a carboxylic acid ester or a silane coupling agent having a bulky structure having a polar group having a side chain that has a molecular weight of at least 300 and having a functional group, and (B) an antistatic agent containing at least one member selected from the group consisting of a quaternary ammonium salt group-containing polymer, a quaternary ammonium salt group-containing silane coupling agent and a hydrolysis condensate of the silane coupling agent.

4. The antistatic coating composition according to claim 3, wherein the silane coupling agent is an organic compound having a functional group as shown in formula (1),

wherein X and Y are respectively independently an oxygen atom, a sulfur atom or an imino group.

5. The antistatic coating composition according to claim 3, wherein the silane coupling agent is a reaction product of an alkoxysilane compound having an isocyanate group and a hydroxyl group-containing acrylate.

6. The antistatic coating composition according to claim 3, wherein the silane coupling agent is a reaction product of a mono(meth)acrylic acid ester of α,ω-hydroxy-terminated polyalkylene glycol and an alkoxysilane compound having an isocyanate group.

7. The antistatic coating composition according to claim 3, wherein the silane coupling agent is a reaction product of an alkoxysilane compound having a mercapto group and an at least difunctional polyfunctional (meth)acrylate.

8. An active energy ray-curable antistatic coating composition, which comprises:
   (A) fine inorganic oxide particles having a side chain silyl ether group having the structure —O—Si—R—S—P, wherein R is a $C_2$–$C_{10}$ alkylene group which may be branched and P is a polymer unit having at least one (meth)acryloyl group, having a molecular weight of at least 300 and having a functional group, and (B) an antistatic agent containing at least one member selected from the group consisting of a quaternary ammonium salt group-containing polymer, a quaternary ammonium salt group-containing silane coupling agent and a hydrolysis condensate of the silane coupling agent.

9. The antistatic coating composition according to claim 8, which further comprises (E) an organic solvent in addition to the components (A) and (B).

10. An active energy ray-curable antistatic coating composition, which comprises:
   (A) fine inorganic oxide particles having a side chain having a molecular weight of at least 300 and having a functional group and (B) an antistatic agent containing at least one member selected from the group consisting of a quaternary ammonium salt group-containing polymer, a quaternary ammonium salt group-containing silane coupling agent and a hydrolysis condensate of the silane coupling agent, said fine inorganic particles being prepared by bonding a silica sol and/or a silicate by way of a sulfide bond with a polymer having a (meth)acryloyl bond obtained by a first step of hydrolysis-condensing a mercapto group-containing silane coupling agent and a silica sol and/or a silicate to prepare a mercapto group-containing silica sol and/or silicate, a second step of polymerizing a monomer having an epoxy group and one radical-polymerizable group or copolymerizing the monomer with another monomer having one radical-polymerizable group, in the presence of the mercapto group-containing silica sol and/or silicate prepared in the first step, to prepare a polymer having an epoxy group bonded with the silica sol and/or silicate by way of a sulfide bond, and a third step of adding a compound having a carboxyl group and a (meth)acryloyl group to the polymer prepared in the second step.

11. An active energy ray-curable antistatic coating composition, which comprises:
(A) fine inorganic oxide particles having a side chain having a molecular weight of at least 300 and having a functional group and (B) an antistatic agent that is a copolymer of (meth)acrylic acid ester, (meth)acrylic acid amide and/or a styrene derivative which has a quaternary salt group.

12. An active energy ray-curable antistatic coating composition, which comprises:
(A) fine inorganic oxide particles having a side chain having a molecular weight of at least 300 and having a functional group and (B) an antistatic agent that comprises a quaternary ammonium salt group-containing polymer that has a (meth)acryloyl group on a side chain.

13. An active energy ray-curable antistatic coating composition, which comprises:
(A) fine inorganic oxide particles having a side chain having a molecular weight of at least 300 and having a functional group and (B) an antistatic agent that comprises a quaternary ammonium salt group-containing polymer that has a polydimethylsiloxane structure on the main chain of the polymer, on the side chain of the polymer or a combination thereof.

14. An active energy ray-curable antistatic coating composition, which comprises:
(A) fine inorganic oxide particles having a side chain having a molecular weight of at least 300 and having a functional group and (B) an antistatic agent that comprises a copolymer of a quaternary ammonium salt group-containing (meth)acrylic acid ester a copolymer of a quaternary ammonium salt group-containing (meth)acrylic acid amide, or a mixture thereof, that contains an α,ω-dimercaptopolydimethylsiloxane as a copolymerizable component.

15. An active energy ray-curable antistatic coating composition, which comprises:
(A) fine inorganic oxide particles having a side chain having a molecular weight of at least 300 and having a functional group and (B) an antistatic agent that comprises a trialkoxysilyl group and a silane coupling agent that has a molecular weight of at least 400 and that has a urethane group or a thioether group, or a hydrolysis condensate thereof.

16. An active energy ray-curable antistatic coating composition, which comprises:
(A) fine inorganic oxide particles having a side chain having a molecular weight of at least 300 and having a functional group, (B) an antistatic agent containing at least one member selected from the group consisting of a quaternary ammonium salt group-containing polymer, a quaternary ammonium salt group-containing silane coupling agent and a hydrolysis condensate of the silane coupling agent, (C) a polyfunctional (meth)acrylate having at least 3 (meth)acryloyl groups in a molecule and (D) a polymerization initiator.

17. A molded product comprising a film obtained by active energy ray-curing the antistatic coating composition as claimed in claim 1.

18. A molded product comprising a film obtained by active energy ray-curing the antistatic coating composition as claimed in claim 3.

19. A molded product comprising a film obtained by active energy ray-curing the antistatic coating composition as claimed in claim 8.

20. A molded product comprising a film obtained by active energy ray-curing the antistatic coating composition as claimed in claim 10.

21. A molded product comprising a film obtained by active energy ray-curing the antistatic coating composition as claimed in claim 11.

22. A molded product comprising a film obtained by active energy ray-curing the antistatic coating composition as claimed in claim 12.

23. A molded product comprising a film obtained by active energy ray-curing the antistatic coating composition as claimed in claim 13.

24. A molded product comprising a film obtained by active energy ray-curing the antistatic coating composition as claimed in claim 14.

25. A molded product comprising a film obtained by active energy ray-curing the antistatic coating composition as claimed in claim 15.

26. A molded product comprising a film obtained by active energy ray-curing the antistatic coating composition as claimed in claim 16.

27. A resin-made film, sheet or molded product having a film obtained by active energy ray-curing the antistatic coating composition as claimed in claim 1.

28. A resin-made film, sheet or molded product having a film obtained by active energy ray-curing the antistatic coating composition as claimed in claim 3.

29. A resin-made film, sheet or molded product having a film obtained by active energy ray-curing the antistatic coating composition as claimed in claim 8.

30. A resin-made film, sheet or molded product having a film obtained by active energy ray-curing the antistatic coating composition as claimed in claim 10.

31. A resin-made film, sheet or molded product having a film obtained by active energy ray-curing the antistatic coating composition as claimed in claim 11.

32. A resin-made film, sheet or molded product having a film obtained by active energy ray-curing the antistatic coating composition as claimed in claim 12.

33. A resin-made film, sheet or molded product having a film obtained by active energy ray-curing the antistatic coating composition as claimed in claim 13.

34. A resin-made film, sheet or molded product having a film obtained by active energy ray-curing the antistatic coating composition as claimed in claim 14.

35. A resin-made film, sheet or molded product having a film obtained by active energy ray-curing the antistatic coating composition as claimed in claim 15.

36. A resin-made film, sheet or molded product having a film obtained by active energy ray-curing the antistatic coating composition as claimed in claim 16.

37. A cured film-formed molded product having a cured film formed by a process comprising:
applying the antistatic coating composition as defined in claim 8 onto a substrate surface,
drying the applied composition to form a film,
processing the substrate and/or the film, and then
curing the film by irradiation with active energy rays.

38. An antistatic coating obtained by active energy ray-curing the antistatic coating composition as defined in claim 1.

39. An antistatic coating obtained by active energy ray-curing the antistatic coating composition as defined in claim 3.

40. An antistatic coating obtained by active energy ray-curing the antistatic coating composition as defined in claim 8.

41. An antistatic coating obtained by active energy ray-curing the antistatic coating composition as defined in claim 10.

42. An antistatic coating obtained by active energy ray-curing the antistatic coating composition as defined in claim 11.

43. An antistatic coating obtained by active energy ray-curing the antistatic coating composition as defined in claim 12.

44. An antistatic coating obtained by active energy ray-curing the antistatic coating composition as defined in claim 13.

45. An antistatic coating obtained by active energy ray-curing the antistatic coating composition as defined in claim 14.

46. An antistatic coating obtained by active energy ray-curing the antistatic coating composition as defined in claim 15.

47. An antistatic coating obtained by active energy ray-curing the antistatic coating composition as defined in claim 16.

* * * * *